US010197405B2

(12) United States Patent
Sato et al.

(10) Patent No.: US 10,197,405 B2
(45) Date of Patent: Feb. 5, 2019

(54) ROUTE GUIDANCE SYSTEM, ROUTE GUIDANCE METHOD, AND COMPUTER PROGRAM

(71) Applicant: AISIN AW CO., LTD., Anjo-shi, Aichi-ken (JP)

(72) Inventors: Yuji Sato, Owariasahi (JP); Masaki Nakamura, Okazaki (JP); Saijiro Tanaka, Okazaki (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 11 days.

(21) Appl. No.: 15/100,516

(22) PCT Filed: Jan. 16, 2015

(86) PCT No.: PCT/JP2015/051024
§ 371 (c)(1),
(2) Date: May 31, 2016

(87) PCT Pub. No.: WO2015/111508
PCT Pub. Date: Jul. 30, 2015

(65) Prior Publication Data
US 2016/0298976 A1    Oct. 13, 2016

(30) Foreign Application Priority Data

Jan. 27, 2014    (JP) .................................. 2014-012857

(51) Int. Cl.
*G01C 21/34*      (2006.01)
*G05D 1/00*       (2006.01)
(Continued)

(52) U.S. Cl.
CPC ......... *G01C 21/34* (2013.01); *G01C 21/3423* (2013.01); *G01C 21/3697* (2013.01);
(Continued)

(58) Field of Classification Search
CPC ............... G01C 21/34; G01C 21/3423; G01C 21/3697; G05D 1/0061; G05D 1/0088;
(Continued)

(56) References Cited

U.S. PATENT DOCUMENTS

| 9,188,985 B1* | 11/2015 | Hobbs ..................... G01C 21/34 |
| 2013/0103313 A1* | 4/2013 | Moore .................... G01C 21/20 |
| | | 701/533 |
| 2016/0305787 A1* | 10/2016 | Sato ..................... G05D 1/0088 |

FOREIGN PATENT DOCUMENTS

| JP | 11-102157 A | 4/1999 |
| JP | 2007-322155 A | 12/2007 |

(Continued)

OTHER PUBLICATIONS

International Search Report for PCT/JP2015/051024 dated Apr. 21, 2015 [PCT/ISA/210].

*Primary Examiner* — Jerrah Edwards
*Assistant Examiner* — Mathew Franklin Gordon
(74) *Attorney, Agent, or Firm* — Sughrue Mion, PLLC

(57) ABSTRACT

A route guidance system, a route guidance method, and a computer program are provided that enable a user to understand in advance a section where automated driving control is interrupted. The route guidance system is configured to: when a recommended route from a departure point to a destination including an automated driving section where automated driving control of a vehicle is performed is searched for, acquire candidate routes that are candidates for the recommended route; specify, for each of the candidate routes, an interruption section where the automated driving control is interrupted in the automated driving section included in the candidate route; and provide guidance, for each of the candidate routes, in a manner distinguishing a section that corresponds to the interruption section from a
(Continued)

section that does not correspond thereto in the automated driving section included in the candidate route.

15 Claims, 10 Drawing Sheets

(51) Int. Cl.
*G01C 21/36* (2006.01)
*G08G 1/0968* (2006.01)

(52) U.S. Cl.
CPC ......... *G05D 1/0061* (2013.01); *G05D 1/0088* (2013.01); *G08G 1/096827* (2013.01); *G08G 1/096844* (2013.01); *G05D 2201/0213* (2013.01)

(58) Field of Classification Search
CPC ..... G05D 2201/0213; G08G 1/096827; G08G 1/096844
See application file for complete search history.

(56) References Cited

FOREIGN PATENT DOCUMENTS

| | | |
|---|---|---|
| JP | 2010-122841 A | 6/2010 |
| JP | 2011-118603 A | 6/2011 |

* cited by examiner

FIG. 3

| ADDITIONAL VALUE α | REASON | |
|---|---|---|
| | MERGING IN SHORT SECTION | CHANGING LANES IN SHORT SECTION |
| 3 | NO DB | NO DB |
| 2 | 100 m OR SHORTER | 100 m OR SHORTER |
| 1 | 500 m OR SHORTER | 500 m OR SHORTER |

| ADDITIONAL VALUE α | REASON | |
|---|---|---|
| | SNOW COVER, ICY ROAD | DENSE FOG |
| 3 | INFORMATION ON ICY ROAD EXISTS ACCORDING TO VICS INFORMATION | INFORMATION ON DENSE FOG EXISTS ACCORDING TO VICS INFORMATION |
| 2 | SNOWFALL PROBABILITY IS HIGH ACCORDING TO WEATHER FORECAST | DENSE FOG PROBABILITY IS HIGH ACCORDING TO WEATHER FORECAST |
| 1 | SNOWFALL IS PREDICTED ACCORDING TO WEATHER FORECAST | DENSE FOG IS PREDICTED ACCORDING TO WEATHER FORECAST |

| ADDITIONAL VALUE α | REASON |
|---|---|
| | LANE RESTRICTION |
| 3 | AFTER OCCURRENCE OF FALLEN OBJECT ACCIDENT WITHIN 30 min |
| 2 | AFTER OCCURRENCE OF FALLEN OBJECT ACCIDENT WITHIN 60 min |
| 1 | AFTER OCCURRENCE OF FALLEN OBJECT ACCIDENT 60 min OR MORE HAS PASSED |

FIG. 8
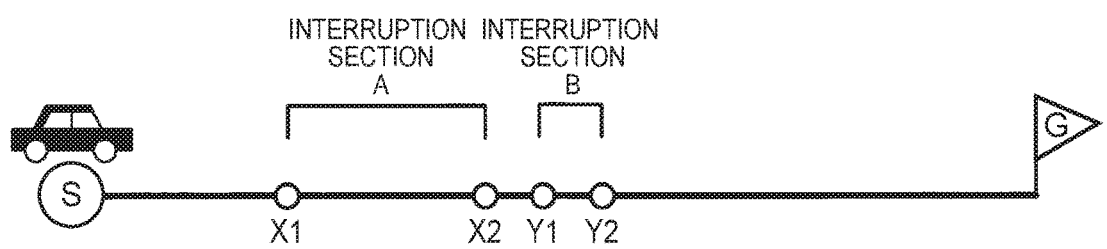
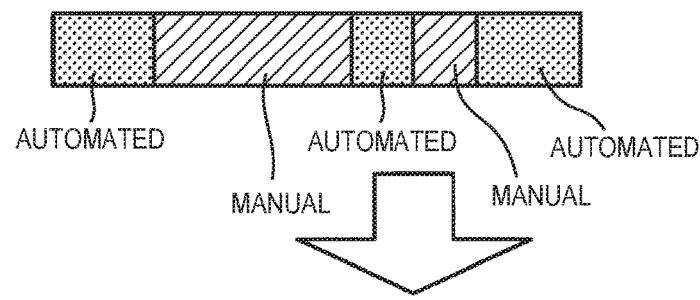
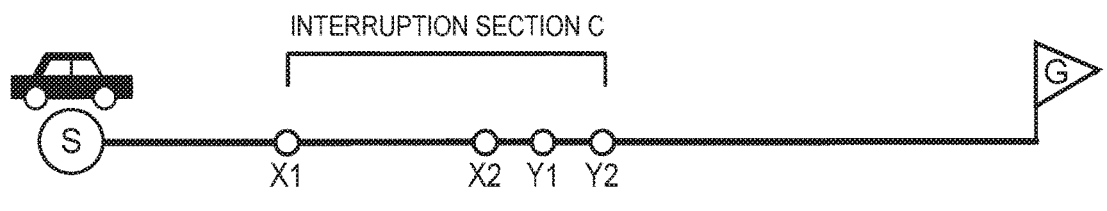
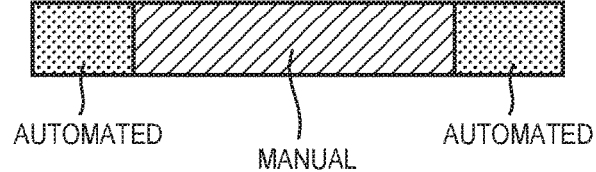

FIG. 11

| ADDITIONAL VALUE α | INTERRUPTION POSSIBILITY | REASON | |
|---|---|---|---|
| | | MERGING IN SHORT SECTION | CHANGING LANES IN SHORT SECTION |
| 3 | HIGH | NO DB | NO DB |
| 2 | MEDIUM | 100 m OR SHORTER | 100 m OR SHORTER |
| 1 | LOW | 500 m OR SHORTER | 500 m OR SHORTER |

| ADDITIONAL VALUE α | INTERRUPTION POSSIBILITY | REASON | |
|---|---|---|---|
| | | SNOW COVER, ICY ROAD | DENSE FOG |
| 3 | HIGH | INFORMATION ON ICY ROAD EXISTS ACCORDING TO VICS INFORMATION | INFORMATION ON DENSE FOG EXISTS ACCORDING TO VICS INFORMATION |
| 2 | MEDIUM | SNOWFALL PROBABILITY IS HIGH ACCORDING TO WEATHER FORECAST | DENSE FOG PROBABILITY IS HIGH ACCORDING TO WEATHER FORECAST |
| 1 | LOW | SNOWFALL IS PREDICTED ACCORDING TO WEATHER FORECAST | DENSE FOG IS PREDICTED ACCORDING TO WEATHER FORECAST |

| ADDITIONAL VALUE α | INTERRUPTION POSSIBILITY | REASON |
|---|---|---|
| | | LANE RESTRICTION |
| 3 | HIGH | AFTER OCCURRENCE OF FALLEN OBJECT ACCIDENT WITHIN 30 min |
| 2 | MEDIUM | AFTER OCCURRENCE OF FALLEN OBJECT ACCIDENT WITHIN 60 min |
| 1 | LOW | AFTER OCCURRENCE OF FALLEN OBJECT ACCIDENT 60 min OR MORE HAS PASSED |

ROUTE GUIDANCE SYSTEM, ROUTE GUIDANCE METHOD, AND COMPUTER PROGRAM

CROSS REFERENCE TO RELATED APPLICATIONS

This application is a National Stage of International Application No. PCT/JP2015/051024, filed on Jan. 16, 2015, which claims priority from Japanese Patent Application No. 2014-012857, filed on Jan. 27, 2014, the contents of all of which are incorporated herein by reference in their entirety.

TECHNICAL FIELD

The present disclosure relates to a route guidance system, a route guidance method, and a computer program for providing guidance for a planned traveling route including an automated driving section where automated driving control of a vehicle is performed.

BACKGROUND ART

In recent years, there are many vehicles equipped with navigation devices configured to provide travel guidance of the vehicles for drivers to be able to easily reach desired destinations. Herein, such a navigation device is a device that can detect the current position of a vehicle equipped therewith by a GPS receiver, for example, and can acquire map data corresponding to the current position from a recording medium such as a DVD-ROM or a HDD or through a network to display the map data on a liquid crystal monitor. Furthermore, this navigation device has a route search function of searching for a recommended route from the current vehicle position to a desired destination when the desired destination is input. The navigation device sets a recommended route thus found as a guidance route, displays the guidance route on a display screen, and also provides audio guidance when, for example, the vehicle approaches an intersection, thereby reliably guiding a user to the desired destination. In recent years, some of mobile phones, smart phones, tablet terminals, and personal computers, for example, have the same functions as that of the navigation device.

In recent years, as a traveling mode of a vehicle, other than manual traveling in which a vehicle travels based on driving operation of a user, traveling by automated driving control has been newly proposed that causes the vehicle to travel in an automated way along a preset route without driving operation of the user. In the automated driving control, for example, the current position of the vehicle, the lane in which the vehicle is traveling, and the positions of other vehicles there around are detected at any time, and vehicle control of the steering, the drive source, and the brake, for example, is automatically performed such that the vehicle travels along the preset route. Although traveling by the automated driving control can advantageously reduce the driving burden on a user, there are situations in which road conditions make it difficult to cause the vehicle to travel by the automated driving control. For example, there are situations in which the vehicle needs to change lanes or merge into another lane in a short section or travel in bad weather. In such situations, the vehicle needs to interrupt traveling by the automated driving control and shift to manual driving.

In view of this, the navigation device described above, for example, is newly required to search for a recommended route in consideration of interruption of the automated driving control described above. For example, in order to cause a vehicle to travel by automated driving control without being interrupted, Patent Document 1 proposes a technique of classifying a road having low accuracy of the current position detected by the GPS as an automated-control inapplicable road on which the vehicle cannot travel by the automated driving control, and searching for a route avoiding the automated-control inapplicable road.

RELATED-ART DOCUMENTS

Patent Documents

[Patent Document 1] Japanese Patent Application Publication No. 2011-118603 (JP 2011-118603 A) (pages 6 to 7, FIG. 4)

SUMMARY

However, in the technique described in Patent Document 1, because a route is searched for such that roads classified as automated-control inapplicable roads are not included, the vehicle can travel by the automated driving control without being interrupted, but situations occur in which a very long roundabout route is searched for and any route cannot be searched for in some cases. In contrast, if a route on which the automated driving control is interrupted is also included to be searched for, without letting a user understand, in advance, in which section on the route the automated driving control is interrupted, the user may experience an unexpected disadvantage, for example, in that the automated driving control is interrupted at a location where the user does not expect the interruption to occur.

The present disclosure has been made to solve conventional problems described above, and an object thereof is to provide a route guidance system, a route guidance method, and a computer program that, when a planned traveling route of a vehicle includes a section where automated driving control is interrupted, make it possible to let a user understand in advance the section where the automated driving control is interrupted.

A first route guidance system), a route guidance method, and a computer program according to the present disclosure for achieving the object are a route guidance system that provides guidance for a planned traveling route of a vehicle including an automated driving section where automated driving control of the vehicle is performed, a route guidance method for performing route guidance using the system, and a computer program that causes the system to further perform the respective functions below. Specifically, the system includes: route acquisition code for acquiring a planned traveling route of a vehicle including an automated driving section where automated driving control of the vehicle is performed; interruption section specifying code for specifying an interruption section where the automated driving control is interrupted in the automated driving section included in the planned traveling route; and route guidance code for providing guidance for the planned traveling route in a manner distinguishing a section that corresponds to the interruption section from a section that does not correspond thereto in the automated driving section included in the planned traveling route.

A second route guidance system, a route guidance method, and a computer program according to the present disclosure are a route guidance system that provides guidance for a planned traveling route of a vehicle including an automated driving section where automated driving control of the vehicle is performed, a route guidance method for performing route guidance using the system, and a computer program that causes the system to further perform the respective functions below. Specifically, the system includes: route acquisition code for acquiring a planned traveling route of a vehicle including an automated driving section where automated driving control of the vehicle is performed; interruption-predicted section specifying code for specifying an interruption-predicted section where there is a possibility that the automated driving control will be interrupted in the automated driving section included in the planned traveling route; and route guidance code for providing guidance for the planned traveling route in a manner distinguishing a section that corresponds to the interruption-predicted section from a section that does not correspond thereto in the automated driving section included in the planned traveling route.

With the first route guidance system, the route guidance method, and the computer program according to the present disclosure having the structure described above, when a planned traveling route of a vehicle includes a section where automated driving control is interrupted, by providing guidance in a manner distinguishing this section from the other sections, it is possible to let the user understand the section where the automated driving control is interrupted. Thus, the user can understand, in advance, in which section the automated driving control is interrupted in the planned traveling route, which makes it possible to prevent unexpected disadvantages for the user, for example, in that the automated driving control is interrupted at a location where the user does not expect the interruption to occur.

With the second route guidance system, the route guidance method, and the computer program according to the present disclosure, when a planned traveling route of a vehicle includes a section where there is a possibility that automated driving control will be interrupted, by providing guidance in a manner distinguishing this section from the other sections, it is possible to let the user understand the section where there is a possibility that the automated driving control will be interrupted. Thus, the user can understand, in advance, in which section there is a possibility that the automated driving control will be interrupted in the planned traveling route, which makes it possible to prevent unexpected disadvantages for the user in that, for example, the automated driving control is interrupted at a location where the user does not expect the interruption to occur.

BRIEF DESCRIPTION OF THE DRAWINGS

FIG. 3 is a figure illustrating an example of correspondence between additional values α and reasons for the interruption of automated driving control.

FIG. 8 is an explanatory diagram for explaining coupling of interruption sections.

FIG. 11 is a figure illustrating an example of correspondence between additional values α and probabilities that the automated driving control will be interrupted.

DETAILED DESCRIPTION OF THE PREFERRED EMBODIMENT

A route guidance system according to the present disclosure will now be described with reference to the drawings on the basis of a first embodiment and a second embodiment implemented in a navigation device.

First Embodiment

Figure 1:
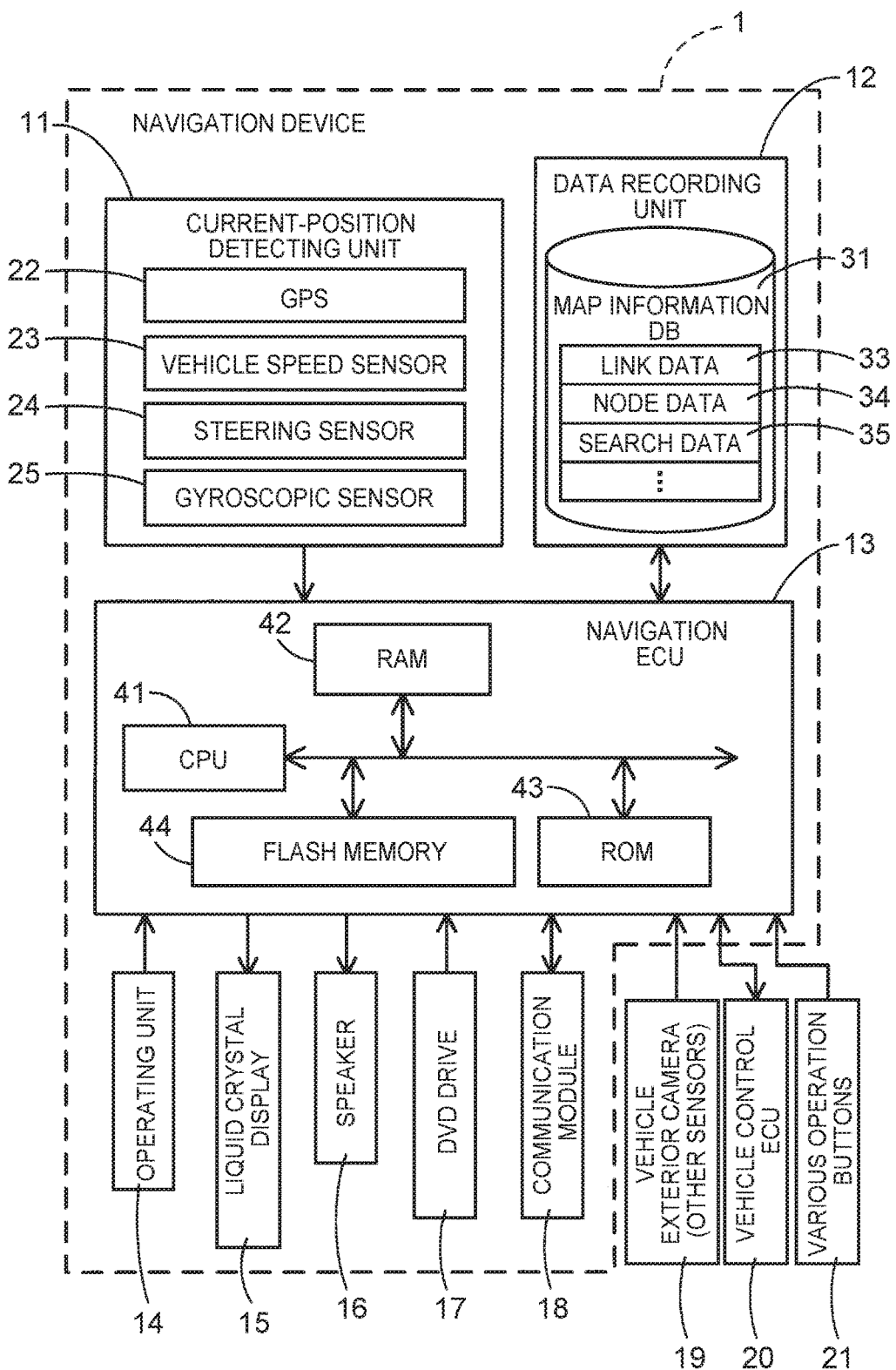
FIG. 1 is a block diagram illustrating a structure of a navigation device according to a first embodiment.

Referring to FIG. 1, a schematic structure of a navigation device 1 according to the first embodiment will be described first. FIG. 1 is a block diagram illustrating the navigation device 1 according to the first embodiment.

As depicted in FIG. 1, the navigation device 1 according to the first embodiment includes: a current-position detecting unit 11 that detects the current position of a vehicle equipped with the navigation device 1; a data recording unit 12 in which various types of data are recorded; a navigation electronic control unit (ECU) 13 that performs various types of arithmetic processing on the basis of input information; an operating unit 14 that receives operation from a user; a liquid crystal display 15 that displays a map around the vehicle, information on a route found by a later-described route search processing to the user, and other items; a speaker 16 that outputs audio guidance about route guidance; a DVD drive 17 that reads a DVD as a recording medium; and a communication module 18 that communicates with information centers such as a probe center and a Vehicle Information and Communication System (VICS, registered trademark) Center. The navigation device 1 is connected to a vehicle exterior camera 19 that is mounted on the vehicle equipped with the navigation device 1 and various sensors through an in-vehicle network such as a CAN. Furthermore, the navigation device 1 is connected to a vehicle control ECU 20 that performs various controls on the vehicle equipped with the navigation device 1 in a manner capable of bidirectional communication. The navigation device 1 is also connected to various operation buttons 21 installed in the vehicle, such as an automated driving switch and an automated driving start button described later.

The following describes the respective components constituting the navigation device 1 in order. The current-position detecting unit 11 includes a GPS 22, a vehicle speed sensor 23, a steering sensor 24, and a gyroscopic sensor 25, and can detect the current position and the orientation of the vehicle, the traveling speed of the vehicle, and the current time, for example. In particular, the vehicle speed sensor 23, which is a sensor for detecting the travel distance of the vehicle and the vehicle speed, generates pulses depending on the rotation of drive wheels of the vehicle, and outputs pulse signals to the navigation ECU 13. The navigation ECU 13 counts the generated pulses to calculate the rotation speed of the drive wheels and the travel distance. Herein, the navigation device 1 does not have to include all of four types of the sensors described above, and the navigation device 1 may include only one or some of these sensors.

The data recording unit 12 includes a hard disk (not depicted) as an external storage and a recording medium and a recording head (not depicted). The recording head is a driver for reading map information DB 31 and a predetermined program, for example, stored in the hard disk and writing predetermined data in the hard disk. Herein, the data recording unit 12 may include an optical disk such as a memory card, a CD, or a DVD instead of the hard disk. The map information DB 31 may be stored in an external server, and the navigation device 1 may be configured to acquire the map information DB 31 through communication.

The map information DB 31 is a storage unit for storing, for example, link data 33 on roads (links), node data 34 on node points, search data 35 used for processing related to search and change of a route, facility data on facilities, map display data for displaying a map, intersection data on respective intersections, and search data for searching for locations.

Examples of data each recorded as the link data 33 include: data on the respective links constituting roads representing widths, slopes, cants, and banks of the roads, conditions of road surfaces, merging sections, the number of lanes of the roads, locations where the number of lanes decreases, locations where the roads narrow, and railroad crossings, for example; data on corners representing curvature radii, intersections, T-junctions, and entrances and exits of the corners, for example; data on road attributes representing downhill roads and uphill roads, for example; data on road types representing ordinary roads such as a national highway, a prefectural road, and a narrow street and toll roads such as a national expressway, an urban expressway, a motor highway, an ordinary toll road, and a toll bridge, for example.

As the node data 34, for example, pieces of data are recorded that relate to: coordinates (locations) of a node point set for each actual road junction (including an intersection and a T-junction) and set for each road at each distance determined based on curvature radii, for example; a node attribute representing whether the node is a node corresponding to an intersection; a connection link number list that is a list of link numbers of links connected to the node; an adjacent node number list that is a list of node numbers of the nodes adjacent to the node through the links; and data regarding the height (altitude) and other properties of each node, for example.

As the search data 35, various types of data are recorded that are used for route search processing in which a route from a departure point (e.g., the current position of the vehicle) to a destination is searched for as described later. Specifically, cost calculation data is stored that is used for calculating a search cost. The search cost means a cost representing the numerical level of appropriateness of an intersection as part of a route (hereinafter, called "intersection cost") and a cost representing the numerical level of appropriateness of a link in a road as part of a route (hereinafter, called "link cost"), for example. Note that, in the first embodiment, a recommended route is searched for by using a required time from the departure point to the destination as described later, and therefore various types of data for calculating a required time for the route is also stored in the search data 35. Herein, the search cost may be defined by the required time.

In the navigation device 1 according to the first embodiment, particularly when a recommended route from the departure point to the destination including an automated driving section where automated driving control of the vehicle is performed is searched for, the recommended route is searched for based on interruption information indicating that the automated driving control is interrupted in the automated driving section. Specifically, when an interruption section where the automated driving control is interrupted is included, additional values corresponding to the numbers of times, durations, distances, and locations of the interruption of the automated driving control and the reasons for the interruption are added to the required times described above, and the resulting required times containing the additional values are compared to each other, whereby the recommended route is searched for.

As a traveling mode of the vehicle, in addition to traveling by manual driving in which the vehicle travels based on driving operation of the user, traveling by the automated driving control is available that causes the vehicle to travel in an automated way along a preset route without driving operation of the user. In the automated driving control, for example, the current position of the vehicle, the lane in which the vehicle is traveling, and the positions of other vehicles there around are detected at any time, and vehicle control of the steering, the drive source, and the brake, for example, is automatically performed by the vehicle control ECU 20 such that the vehicle travels along the route preset. Details of the automated driving control are already publicly known, and thus description thereof is omitted. The automated driving control may be performed in all road sections. However, the following description is made assuming that, as an automated driving section where the automated driving control of the vehicle is performed, an expressway is set that is provided with gates (it does not matter whether the gate is manned or unmanned, or whether it is toll-free or charged) at boundaries between the expressway and other roads connected thereto, and the automated driving control is basically performed only when the vehicle is traveling in the automated driving section. Note that another section may be set as the automated driving section. For example, a national expressway, an urban expressway, a motor highway, a toll road, and an ordinary road may be set as the automated driving section. When the vehicle travels in the automated driving section, the automated driving control is not always performed, and the automated driving control is selected to be performed by the user and is performed only in situations appropriate for the vehicle to travel by the automated driving control as described later. In other words, the automated driving section is a section where the vehicle is allowed to perform the automated driving control in addition to the manual driving.

Although traveling by the automated driving control can advantageously reduce the driving burden on the user, there are situations in which road conditions make it difficult to cause the vehicle to travel by the automated driving control. In the navigation device 1 according to the first embodiment, sections where such situations occur in which it is difficult for the vehicle to perform the automated driving control in the automated driving section are set as interruption sections where the automated driving control of the vehicle is interrupted to cause the vehicle to travel by the manual driving. The setting of the interruption sections is basically performed during route search, and is also performed when the vehicle is traveling after the route search. For example, when a section where lane markings ahead of the vehicle in the traveling direction are faint is newly detected or a section where the weather has quickly become worse is newly detected, it is difficult to perform the automated driving control in this section, and thus this section is newly set as an interruption section. Details of the setting of the interruption sections and route search based on the set interruption sections are described later.

The navigation ECU 13, which is an electronic control unit that performs overall control of the navigation device 1, includes a CPU 41 serving as an arithmetic unit and a control unit, and also includes internal storages such as: a RAM 42 that is used as a working memory when the CPU 41 performs various types of arithmetic processing and that stores route date, for example, when a route is searched for; a ROM 43 that stores a route-search processing program (see FIG. 2) and an automated-driving-control processing program (see FIG. 9) described later, for example, in addition to control programs; and a flash memory 44 that stores programs read from the ROM 43. The navigation ECU 13 configures various types of code as processing algorithms. For example, the route acquisition code acquires a planned traveling route of the vehicle including an automated driving section where the automated driving control of the vehicle is performed. The interruption section specifying code specifies an interruption section where the automated driving control is interrupted in the automated driving section included in the planned traveling route. The route guidance code provides guidance for the planned traveling route in a manner distinguishing a section that corresponds to the interruption section from a section that does not correspond thereto in the automated driving section included in the planned traveling route.

The operating unit 14 is operated when a departure point as a travel start point and a destination as a travel end point are input, for example, and includes a plurality of operation switches (not depicted) such as various keys and buttons. The navigation ECU 13, based on switch signals output by depressing the respective switches, for example, performs the various corresponding controls. The operating unit 14 may be alternatively structured with a touch panel provided on a front surface of the liquid crystal display 15. The operating unit 14 may be also structured with a microphone and a voice recognition device.

The liquid crystal display 15 displays a map image including roads, traffic information, operation guidance, an operation menu, guidance for keys, candidates for a recommended route from the departure point to the destination that are found during route search, various types of information on the candidates for the recommended route, guidance information along a guidance route, news, weather forecasts, time, mail, and television programs, for example. Instead of the liquid crystal display 15, a HUD or a HMD may be used.

The speaker 16 outputs audio guidance providing guidance for traveling along the guidance route based on instructions from the navigation ECU 13 and guidance about traffic information.

The DVD drive 17 is a drive that can read data stored in a recording medium such as a DVD or a CD. Based on the read data, music or video is replayed and the map information DB 31 is updated, for example.

The communication module 18 is a communication device for receiving traffic information, probe information, and weather information, for example, transmitted from traffic information centers such as a VICS center and a probe center, and examples of the communication module 18 include a mobile phone and a DCM. The examples also include a vehicle-to-vehicle communication device that communicates between vehicles and a road-to-vehicle communication device that communicates between a roadside unit and a vehicle.

The vehicle exterior camera 19 is structured with a camera using a solid-state image sensing device such as a CCD, and is attached above a front bumper of the vehicle and is disposed with its optical axis directed downward by a predetermined angle from the horizontal plane. The vehicle exterior camera 19 captures images of a scene ahead of the vehicle in the traveling direction when the vehicle travels in the automated driving section. The vehicle control ECU 20 detects lane markings painted on a road on which the vehicle travels and detects other vehicles there around, for example, by performing image processing on the captured images, and performs the automated driving control of the vehicle on the basis of the detection result. Meanwhile, the navigation ECU 13 detects a section (e.g., a section where lane markings are faint) where a situation occurs in which it is difficult for the vehicle to perform the automated driving control on the basis of the captured images captured by the vehicle exterior camera 19 as described later when the vehicle travels in the automated driving section. The section thus detected is newly set as an interruption section as described later. The vehicle exterior camera 19 may be disposed on the rear or the side of the vehicle other than the front thereof. To detect a section where a situation occurs in which it is difficult for the vehicle to travel by the automated driving control, instead of the vehicle exterior camera 19, various sensors such as an illuminance sensor and a rain sensor may be used. In this case, for example, heavy rain or dense fog can be detected. As means for detecting other vehicles, instead of the camera, a sensor such as a millimeter wave radar, vehicle-to-vehicle communication, or road-to-vehicle communication may be used.

The vehicle control ECU 20 is an electronic control unit that controls the vehicle equipped with the navigation device 1. The vehicle control ECU 20 is connected to various drive units of the vehicle, such as a steering, a brake, and an accelerator. In the first embodiment, particularly when the vehicle travels in the automated driving section, the vehicle control ECU 20 controls the various drive units to perform the automated driving control of the vehicle. The navigation ECU 13 transmits an instruction signal related to the automated driving control to the vehicle control ECU 20 through the CAN at the time when a planned traveling route (guidance route) of the vehicle has been determined. The vehicle control ECU 20 then performs the automated driving control after the start of traveling in accordance with the received instruction signal. The contents of the instruction signal are information specifying the planned traveling route (guidance route) and information on control contents (e.g., going straight, changing lanes to the right, merging) of the automated driving control performed on the vehicle that are set for sections in the automated driving section included in the planned traveling route from which interruption sections are excluded.

Figure 2:
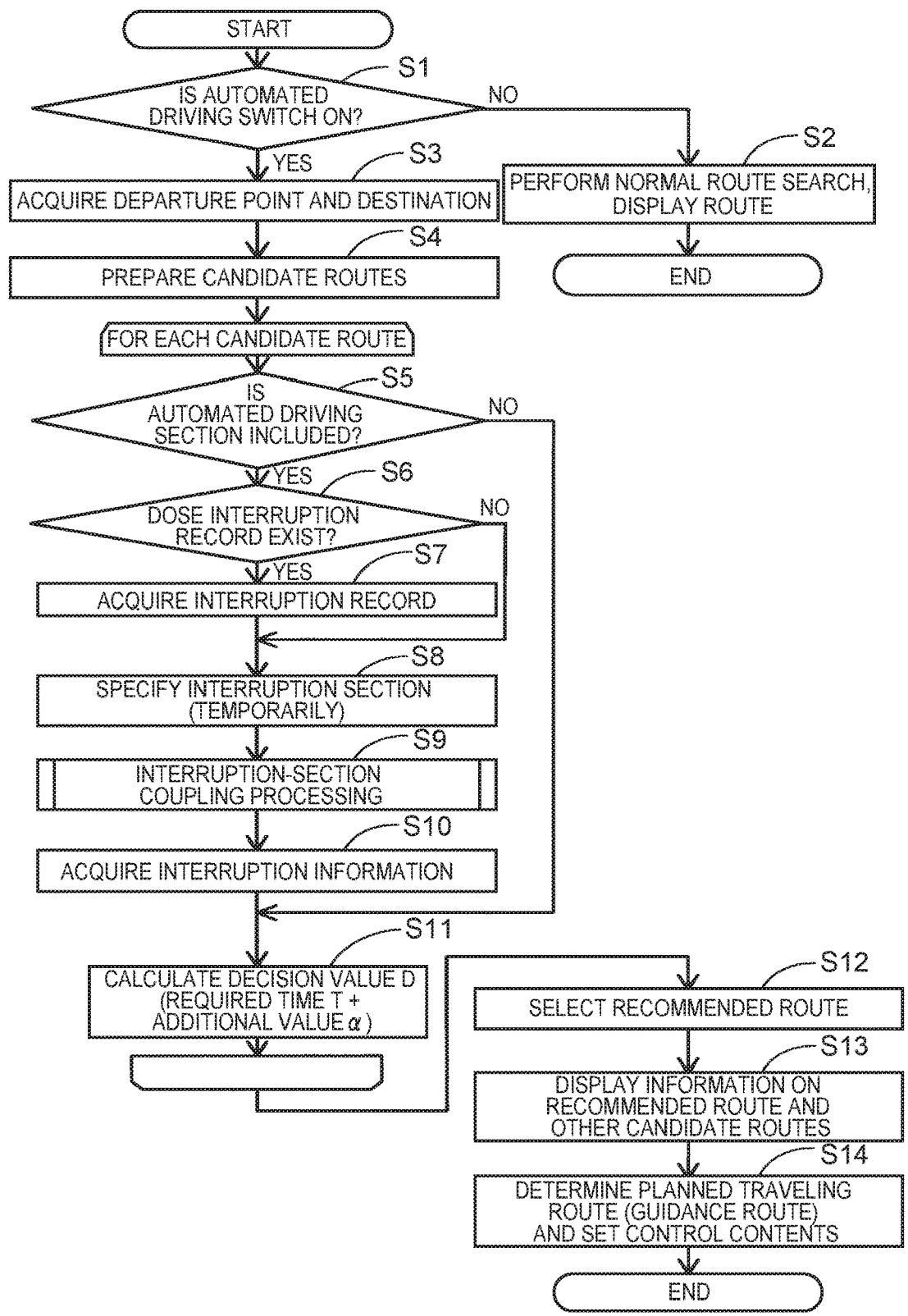
FIG. 2 is a flowchart of a route-search processing program according to the first embodiment.

The following describes the route-search processing program that the CPU 41 executes in the navigation device 1 according the first embodiment having the structure described above with reference to FIG. 2. FIG. 2 is a flowchart of the route-search processing program according to the first embodiment. This route-search processing program, which is executed when predetermined operation for performing route search is received in the navigation device 1, is a program for searching for a recommended route from a departure point to a destination. Programs illustrated by the flowcharts in FIG. 2, FIG. 7, FIG. 9, and FIG. 10 are stored in the RAM 42 and the ROM 43 included in the navigation device 1, and are executed by the CPU 41.

To begin with, in the route-search processing program, at step (hereinafter, abbreviated as "S") 1, the CPU 41 determines whether the automated driving switch is ON. This automated driving switch is a switch that allows the user to switch between causing the vehicle to basically perform the automated driving control in the automated driving section and causing the vehicle to perform the manual driving without performing the automated driving control, and is disposed on an instrument panel, for example.

If it is determined that the automated driving switch is ON (YES at S1), the process proceeds to S3. If it is determined that the automated driving switch is OFF (NO at S1), the process proceeds to S2.

Specifically, when it has been determined that the automated driving switch is ON, the user wants the automated driving control to be performed in the automated driving section. Thus, at and after S3 described later, the CPU 41 assumes that the vehicle basically performs the automated driving control in the automated driving section, and searches for a recommended route from the departure point to the destination.

In contrast, when it has been determined that the automated driving switch is OFF, the user wants the manual driving to be performed in the automated driving section without performing the automated driving control. Thus, at S2, the CPU 41 assumes that the vehicle performs the manual driving in the automated driving section, and searches for a recommended route from the departure point to the destination. Herein, the search processing for a recommended route at S2 is the same as normal route search processing in which the automated driving control is not considered, and thus description thereof is omitted. When the route search processing is performed, guidance for a recommended route and the other candidate routes other than the recommended route (e.g., routes found through search with priority on distance, priority on ordinary roads, and priority on toll roads) is displayed on the liquid crystal display 15. Out of the routes for which guidance is displayed, the user selects a planned traveling route (guidance route) of the vehicle. Subsequently, the navigation device 1 provides guidance for traveling on the basis of the planned traveling route thus selected.

At S3, the CPU 41 acquires the departure point and the destination. The departure point may be the current position of the vehicle, or may be any location (e.g., home) designated by the user. The destination is acquired based on operation (e.g., operation of searching for or selecting a facility) of the user that the operating unit 14 receives.

Next, at S4, the CPU 41 prepares candidate routes that are candidates for the recommended route. The preparation of the candidate routes is performed by using a known Dijkstra's algorithm. Specifically, the route search is performed from the departure point side and also from the destination side. In the overlapping area between the search from the departure point side and the search from the destination side, a cost added value is calculated that is a value obtained by adding up the search cost (the node cost and the link cost) accumulated from the departure point side, the search cost accumulated from the destination side, and the toll cost based on tolls required for the travel. The CPU 41 specifies a certain number of (e.g., a maximum of five) routes as the candidate routes in ascending order of the cost added value thus calculated.

The processing of the following S5 to S11 is performed for each candidate route prepared at S4 described above. After the processing of S5 to S11 is performed for all of the prepared candidate routes, the process proceeds to S12.

At S5, the CPU 41 determines whether an automated driving traveling section is included in each candidate route to be processed. This automated driving section is a section where the automated driving control is basically performed when the vehicle travels in this section as described above and, for example, an expressway falls thereunder.

If it is determined that an automated driving section is included in the candidate route to be processed (YES at S5), the process proceeds to S6. If it is determined that no automated driving section is included in the candidate route to be processed (NO at S5), the process proceeds to S11.

At S6, the CPU 41 determines whether, about the automated driving section included in the candidate route to be processed, there is an interruption record of the automated driving control recorded when the vehicle traveled in this section in the past. The interruption record of the automated driving control includes information specifying the location (the start position and the end position of the interruption), the time, and the distance of the interruption of the automated driving control and the reasons for the interruption. The interruption record of the automated driving control may be stored in the data recording unit 12, or may be stored in an external server. Furthermore, if the interruption record is stored in the external server, in addition to the interruption record of the vehicle, interruption records of other vehicles may be also stored therein.

If it is determined that, about the automated driving section included in the candidate route to be processed, there is an interruption record of the automated driving control recorded when the vehicle traveled in this section in the past (YES at S6), the process proceeds to S7. If it is determined that, about the automated driving section included in the candidate route to be processed, there is no interruption record of the automated driving control recorded when the vehicle traveled in this section in the past (NO at S6), the process proceeds to S8.

At S7, about the automated driving section included in the candidate route to be processed, the CPU 41 acquires the interruption record of the automated driving control recorded when the vehicle traveled in this section in the past. Specifically, when the interruption record of the automated driving control is stored in the data recording unit 12, the interruption record is read out from the data recording unit 12. If the interruption record of the automated driving control is alternatively stored in the external server, the interruption record is acquired by communicating with the external server.

Subsequently, at S8, the CPU 41 specifies a section (hereinafter, called "interruption section") where the automated driving control is interrupted in the automated driving section included in the candidate route. As the interruption section, a section where a situation occurs in which it is difficult for the vehicle to perform the automated driving control is specified base on road shapes, lane markings, traffic information, weather information, and interruption records of the automated driving control in the past, for example. In the interruption section, the automated driving control of the vehicle is interrupted, and traveling by the manual driving is performed. For example, a section that falls under any of the conditions (1) to (5) below is specified as an interruption section.

(1) a section where merging or lane change is necessary in a short distance (e.g., 500 meters or shorter).

(2) a section where lane markings (e.g., a roadway centerline, a lane boundary, a roadway outside line) disappear or fade to the extent that the lane markings cannot be recognized by a camera.

(3) a section where lanes are restricted due to an accident, construction, or a fallen object, for example, and which lane is restricted cannot be identified.

(4) a section where the weather is so bad (e.g., heavy rain, dense fog, snow cover, icy road) that it is difficult to perform detection with a camera and sensors or it is difficult to perform vehicle control when the vehicle travels.

(5) a section where the automated driving control was interrupted in the past other than the sections that fall under the conditions of (1) to (4).

Whether a section falls under the conditions (1) to (4) is determined based on, for example, map information, VICS information, probe information, vehicle-to-vehicle communication, and road-to-vehicle communication. Whether a section falls under the condition (5) is determined based on the interruption record acquired at S7 described above. Note that the interruption section specified at S8 described above is a temporarily specified one, and is subjected to coupling of interruption sections at S9 described later to be finally determined and set as an interruption section. Furthermore, the setting of the interruption section is basically performed during route search (S8, S9), and is also performed when the vehicle is traveling after the route search as described later (S47 in FIG. 10).

Next, at S9, the CPU 41 performs interruption-section coupling processing (FIG. 7) described later. The interruption-section coupling processing is processing for connecting interruption sections that satisfy a certain condition and are adjacently arranged along a candidate route as described later to set one continuous interruption section.

Subsequently, at S10, based on the interruption section set at S8 and S9 described above, the CPU 41 acquires interruption information indicating that the automated driving control is interrupted in the candidate route to be processed. The interruption information contains the number of times, durations, distances, and locations of the interruption of the automated driving control in the candidate route to be processed and the reasons for the interruption. Herein, the times, the distances, the locations, and the reasons are acquired for the respective interruption sections.

Subsequently, at S11, the CPU 41 calculates, for the candidate route to be processed, a decision value D that is an index for selection of a recommended route. Specifically, the decision value D is calculated by a method described below.

To begin with, a required time T (minute) necessary for the vehicle to travel in a candidate route is acquired. The required time T is calculated based on map information, and traffic information, for example. Next, to the required time T thus calculated, an additional value $\alpha$ based on the interruption information acquired at S10 described above is added. The sum of the required time T and the additional value $\alpha$ is set as a decision value D. The additional value $\alpha$ is calculated by using at least one or more of the number of times, durations, distances, locations of the interruption of the automated driving control and the reasons for the interruption. For example, any one of or the sum of some of (A) to (C) below is set as the additional value $\alpha$. (A) two minutes multiplied by the number of times that the automated driving control is interrupted on the candidate route, (B) sum (minute) of durations during which the automated driving control is interrupted on the candidate route, (C) sum (km) of distances for which the automated driving control is interrupted on the candidate route.

When the additional value $\alpha$ is calculated by using locations where the automated driving control is interrupted, calculation is made such that the additional value $\alpha$ is larger as a location of the interruption is closer to the destination on the candidate route. For example, the ratio of "the distance from the departure point to the interruption end point" to "the total length of the candidate route" is multiplied by "the required time×0.1", and the product is set as the additional value $\alpha$. When a plurality of interruption sections exist, the additional value $\alpha$ may be calculated for each of the interruption sections, and the decision value D may be calculated by using only the largest additional value $\alpha$, or the decision value D may be calculated by adding all the calculated additional values $\alpha$ to the required time T.

When the additional value $\alpha$ is calculated by using reasons for the interruption of the automated driving control, calculation is made such that the additional value $\alpha$ is larger as it is more difficult for the vehicle to travel by the automated driving control. Herein, FIG. 3 is a figure illustrating an example of correspondence between additional values $\alpha$ and reasons for the interruption of the automated driving control. For example, in the case where the candidate route includes a section that is set as an interruption section because merging or lane change is performed in a short section (e.g., 500 meters or shorter), particularly when the candidate route includes an interruption section where merging or lane change is performed in a distance longer than 100 meters and equal to or shorter than 500 meters, the additional value $\alpha$ is calculated to be "1". When the candidate route includes an interruption section where merging or lane change is performed in a distance equal to or shorter than 100 meters, the additional value $\alpha$ is calculated to be "2". When the road shape of the interruption section where merging or lane change is performed cannot be identified from map information, the additional value $\alpha$ is calculated to be "3". In the case where the candidate route includes a section that is set as an interruption section because of snow cover or an icy road when the vehicle travels, particularly when the candidate route includes an interruption section for which icy road information exists in VICS information, the additional value $\alpha$ is calculated to be "3". When the candidate route includes an interruption section for which VICS information does not exist but the snowfall probability is high according to the weather forecast (e.g., 80% or higher), the additional value $\alpha$ is calculated to be "2". When the candidate route includes an interruption section for which VICS information does not exist and the snowfall probability is low according to the weather forecast (e.g., lower than 80%), the additional value $\alpha$ is calculated to be "1". In the same manner, for other reasons, the additional values are calculated as depicted in FIG. 3. Herein, when there are a plurality of interruption sections, the additional value $\alpha$ may be calculated for each of the interruption sections, and the decision value D may be calculated by using only the largest additional value $\alpha$, or the decision value D may be calculated by adding all the additional values $\alpha$ calculated to the required time T.

If no automated driving section is included in the candidate route to be processed (NO at S5), the required time T (minute) necessary for the vehicle to travel on the candidate route is set to be the decision value D. After the decision values D are calculated for all of the candidate routes prepared at S4 described above, the process proceeds to S12.

At S12, the CPU 41 selects a recommended route from among the candidate routes prepared at S4 described above. Specifically, the CPU 41 compares the decision values D of the respective candidate routes and selects, from among the candidate routes, the candidate route having the smallest decision value D as the recommended route. Herein, the recommended route may be selected in plurality. Note that, at S12, as a recommended route, the candidate route having the smallest decision value D is selected regardless of whether an interruption section is included therein. Thus, there are occasions when a candidate route including an interruption section is selected as a recommended route, and there are occasions when a candidate route including no interruption section is selected as a recommended route.

Next, at S13, the CPU 41 provides guidance about the respective pieces of information on the recommended route selected at S12 described above and the other candidate routes other than the recommended route. Herein, guidance only about the information on the recommended route may be provided. Alternatively, among the candidate routes other than the recommended route, not all of these routes but only a certain number of (e.g., two in the ascending order of the decision value D) routes may be picked up as routes the guidance for which is provided. In particular, when an automated driving section is included in the recommended route or in the other candidate routes, guidance is provided in a manner distinguishing a section that corresponds to an interruption section from a section that does not correspond thereto. In other words, guidance about the section that corresponds to an interruption section and guidance about the section that does not correspond thereto are provided in different guidance manners. Furthermore, when guidance for the recommended route and the other candidate routes is provided, guidance about the interruption information acquired at S10 described above is provided together.

Figure 4:
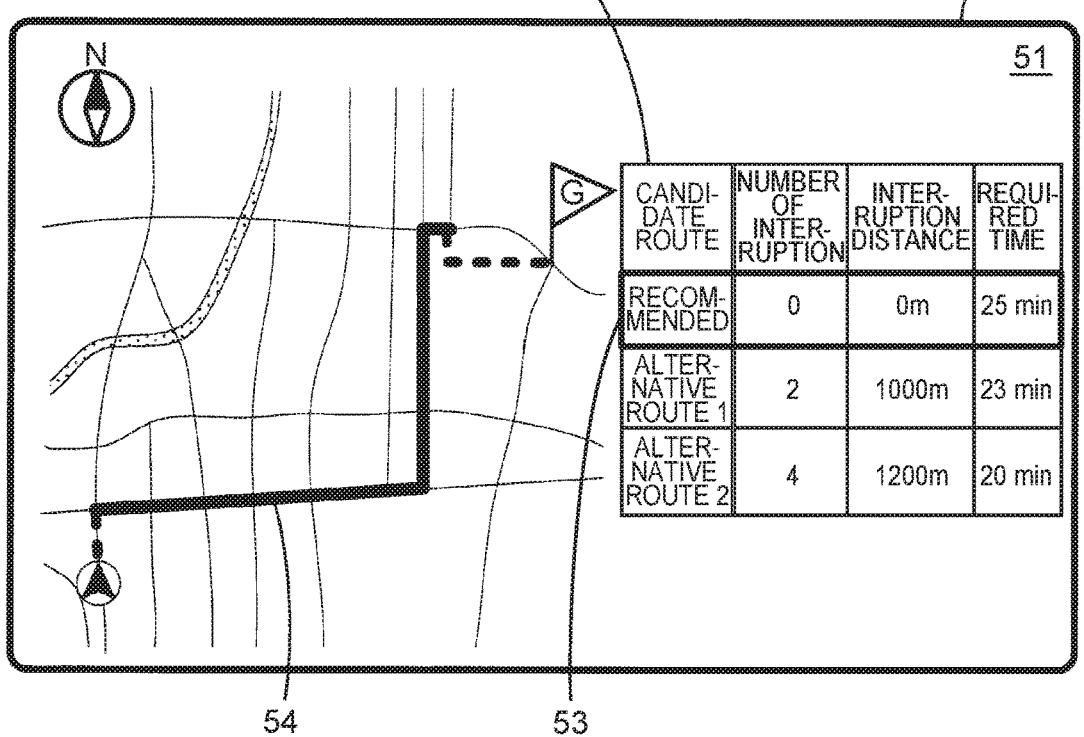
FIG. 4 is a diagram illustrating a route guidance screen providing guidance for a recommended route displayed on a liquid crystal display.
Figure 5:
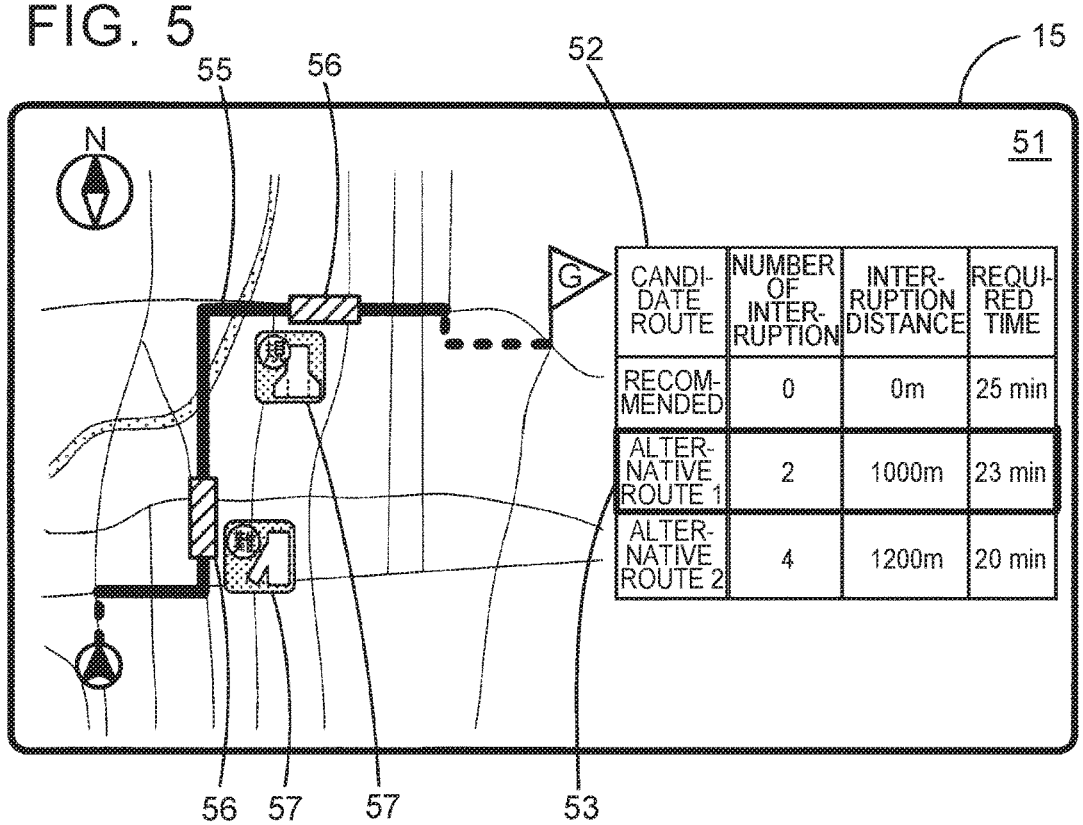
FIG. 5 is a diagram illustrating the route guidance screen providing guidance for a candidate route other than the recommended route displayed on the liquid crystal display.

FIG. 4 and FIG. 5 are diagrams illustrating a route guidance screen 51 that provides guidance for a recommended route and candidate routes other than the recommended route displayed on the liquid crystal display 15 at S13 described above. As depicted in FIG. 4 and FIG. 5, on the route guidance screen 51, an information window 52 is displayed that displays information on the recommended route and other candidate routes to be guided in a list form for each route. The route that is particularly selected by a cursor 53 in the information window 52 is displayed in a manner superimposed on the map image at the left side of the screen. For example, FIG. 4 depicts the route guidance screen 51 in which the recommended route 54 is selected, and FIG. 5 depicts the route guidance screen 51 in which the candidate route 55 other than the recommended route is selected. In the information window 52, information particularly containing interruption information is displayed as information on the recommended route, for example. Specifically, (a) the number of times that the automated driving control is interrupted on the route, (b) the total distance for which the automated driving control is interrupted on the route, and (c) the required time are displayed for each route. Herein, the total duration during which the automated driving control is interrupted on the route may be displayed. The information window 52 is displayed in a sorted manner, which specifically provides guidance for a route with a higher priority in a prioritized manner among the candidate routes. The priorities are basically set to be higher for a smaller decision value D, but may be set based on the number of times, durations, distances, and locations of the interruption of the automated driving control and the reasons for the interruption. When the recommended route 54 or the candidate route 55 displayed in a manner superimposed on the map image at the left side of the screen includes an automated driving section, the displaying is performed such that a section that corresponds to the automated driving section is distinguished from a section that does not correspond thereto. For example, in the examples depicted in FIG. 4 and FIG. 5, the automated driving sections are indicated by solid lines, and sections other than the automated driving sections are indicated by dashed lines. In particular, for each section corresponding to an interruption section in the automated driving section, a section-specifying line segment 56 connecting between the start point and the end point of the interruption section is displayed so as to distinguish the section from the other sections. Furthermore, near each section-specifying line segment 56, the reason for the interruption of the automated driving control is displayed with an interruption icon 57. For example, in the route guidance screen 51 depicted in FIG. 5, interruption sections exist at two locations on the candidate route 55, and it is indicated that the interruption section on the departure point side is set as an interruption section because of being a section where merging needs to be performed in a short section. It is also indicated that the interruption section on the destination side is set as an interruption section because of being a section where lanes are restricted due to an accident, construction, or a fallen object, for example, and which lane is restricted cannot be identified.

By watching the route guidance screen 51 displayed on the liquid crystal display 15, the user can understand the recommended route and the candidate routes other than the recommended route from the departure point to the destination and where and how the automated driving control is interrupted when traveling on the respective routes (e.g., the numbers of times, durations, distances, and locations of the interruption of the automated driving control and the reasons for the interruption).

Next, at S14, the CPU 41 determines a planned traveling route (guidance route) of the vehicle on the basis of operation of the user from among the recommended route and the candidate routes other than the recommended route for which guidance is provided at S13 described above. Herein, the CPU 41 may be configured to determine the recommended route as the planned traveling route without having the user make a selection. Subsequently, for sections in the automated driving section included in the planned traveling route from which interruption sections are excluded, the CPU 41 sets control contents (e.g., going straight, changing lanes to the right, merging) of the automated driving control performed on the vehicle.

Figure 6:
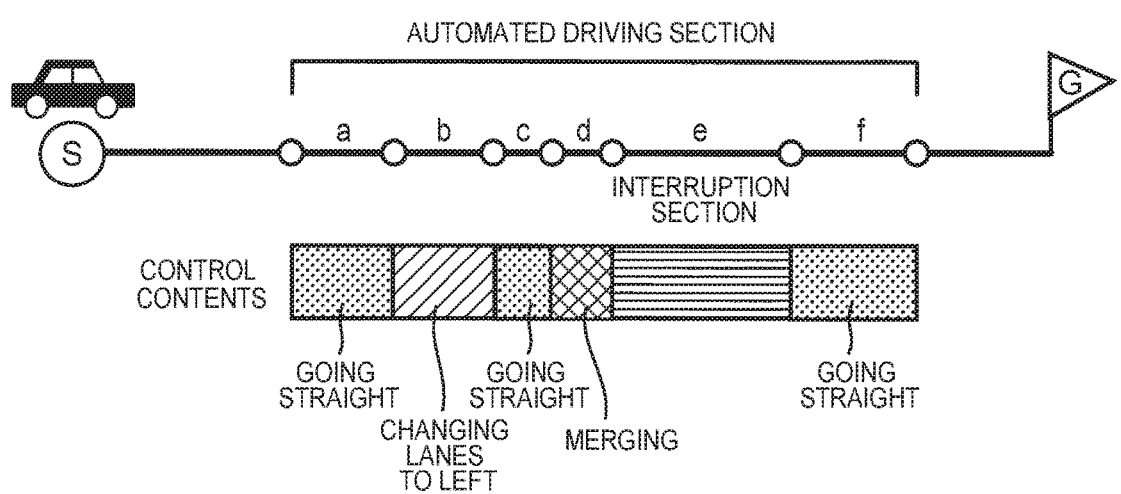
FIG. 6 is a diagram illustrating an example of control contents of the automated driving control that are set for a planned traveling route of a vehicle.

For example, the example depicted in FIG. 6 is an example of the control contents of the automated driving control that is set when sections a to f constitute an automated driving section in the planned traveling route of the vehicle. In the example depicted in FIG. 6, for the sections a to d, and f obtained by excluding the section e from the sections a to f because the section e is an interruption section, the control contents of the automated driving control are set. The control contents of the automated driving control are basically determined based on the planned traveling route and map information and, for example, for a section where merging into a main lane in an IC, for example, is necessary, "merging" is set as a control content of the automated driving control. For a section where lane change is necessary to move into another expressway at a JCT, for example, "changing lanes to the right (left)" is set. The information specifying the planned traveling route and the control contents thus set are transmitted to the vehicle control ECU 20 through the CAN. Consequently, when the vehicle starts traveling, the vehicle control ECU 20 performs automated driving control after the start of traveling on the basis of the information received from the navigation device 1.

Figure 7:
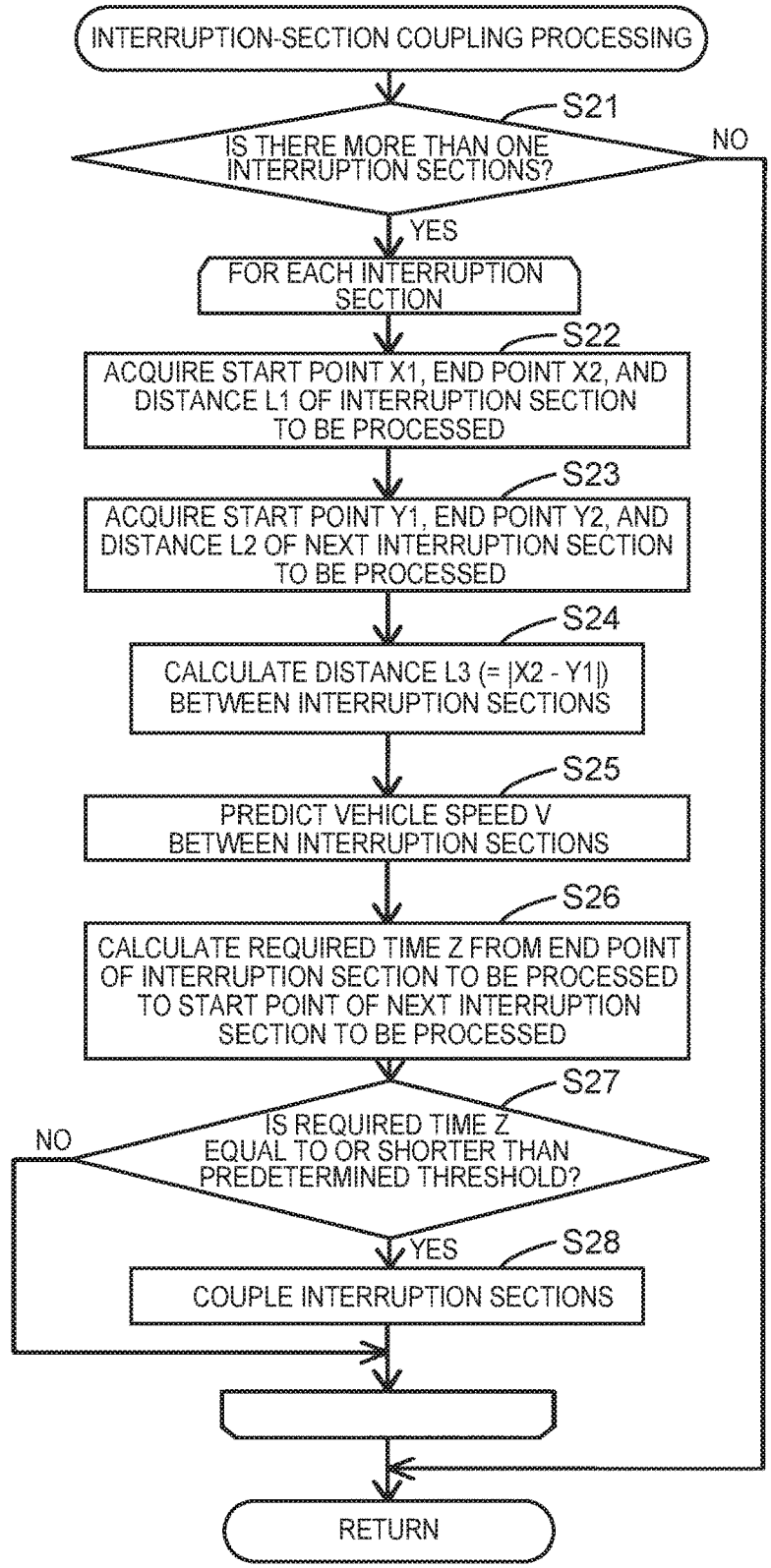
FIG. 7 is a flowchart of a sub-processing program of interruption-section coupling processing.

The following describes sub-processing of interruption-section coupling processing performed at S9 described above with reference to FIG. 7. FIG. 7 is a flowchart of a sub-processing program of the interruption-section coupling processing.

To begin with, at S21, the CPU 41 determines, for each candidate route to be processed, whether the number of interruption sections specified at S8 described above is more than one.

If it is determined that, for the candidate route to be processed, the number of interruption sections specified at S8 described above is more than one (YES at S21), the process proceeds to S22. If it is determined that the number of interruption sections is only one or no interruption section is included (NO at S21), the process proceeds to S10 without performing coupling on interruption sections.

The processing from the following S22 to S28 is performed on each interruption section included in the candidate route to be processed. To begin with, the processing is performed on the interruption section closest to the departure point, and then the processing is performed in order from the interruption section closer to the departure point. The processing from S22 to S28 is performed on up to the interruption section second closest to the destination, and then the process proceeds to S10.

At S22, the CPU 41 acquires each of a start point X1, an end point X2, and a distance L1 ($=|X2-X1|$) of an interruption section to be processed.

Next, at S23, the CPU 41 acquires each of a start point Y1, an end point Y2, and a distance L2 ($=|Y2-Y1|$) of an interruption section to be subsequently processed (i.e., an interruption section that is set adjacently to the interruption section to be processed on the destination side).

Subsequently, at S24, the CPU 41 calculates a distance L3 ($=|X2-Y1|$) between the interruption section to be processed (hereinafter, called "first interruption section") and the interruption section to be subsequently processed (hereinafter, called "second interruption section").

Subsequently, at S25, the CPU 41 predicts a vehicle speed V of the vehicle traveling between the first interruption section and the second interruption section. The vehicle speed V may be a speed limit (e.g., 80 km/h) of a road specified based on map information, or may be an average vehicle speed in the corresponding section acquired from VICS information or probe information. The vehicle speed V is preferably predicted in consideration of traffic information such as congestion information.

Subsequently, at S26, based on the distance L3 calculated at S24 described above and the vehicle speed V predicted at S25 described above, the CPU 41 calculates a required time Z ($=L3/V$) that is necessary for the vehicle to travel from the end point of the first interruption section to the start point of the second interruption section.

Next, at S27, the CPU 41 determines whether the required time Z calculated at S26 described above is equal to or shorter than a predetermined threshold. The threshold that is a criterion for determination at S27 described above is set based on road types and road shapes, for example, which is a period of time considered to be the upper limit for the interval of switching between the automated driving control and the manual driving to make the user feel troublesome, and is set to be one minute, for example. Herein, the user may set the value of the threshold. Alternatively, at S27 described above, instead of whether the required time Z is equal to or shorter than the threshold, the CPU 41 may be configured to determine whether the distance L3 between the first interruption section and the second interruption section is equal to or shorter than a threshold (e.g., one kilometer).

If it is determined that the required time Z calculated at S26 described above is equal to or shorter than the predetermined threshold (YES at S27), the process proceeds to S28. If it is determined that the required time Z calculated at S26 described above is longer than the predetermined threshold (NO at S27), the process returns to S22, and after changing the interruption section to be processed, the processing at and after S22 is performed again.

At S28, the CPU 41 connects the first interruption section and the second interruption section, thereby setting these interruption sections as one continuous interruption section. For example, a case will be described in which two interruption sections of the interruption section A and the interruption section B are set adjacently along the candidate route as depicted in FIG. 8. In this case, if the interruption sections are not coupled together at S28 described above, the automated driving control is performed up to the point X1, the manual driving is performed from the point X1 to the point X2, the automated driving control is performed from the point X2 to the point Y1, the manual driving is performed from the point Y1 to the point Y2, and the automated driving control is performed from the point Y2. Thus, switching between the automated driving control and the manual driving is performed frequently. In contrast, if the interruption section A and the interruption section B are connected and one new interruption section C starting at X1 and ending at Y2 is set at S28 described above, the manual driving is continuously performed from the point X1 to the point Y2, so that the switching between the automated driving control and the manual driving can be prevented from being performed frequently.

Subsequently, the process returns to S22, and after changing the interruption section to be processed, the processing at and after S22 is performed again. The processing from S22 to S28 is performed on up to the interruption section second closest to the destination, and then the process proceeds to S10.

Figure 9:
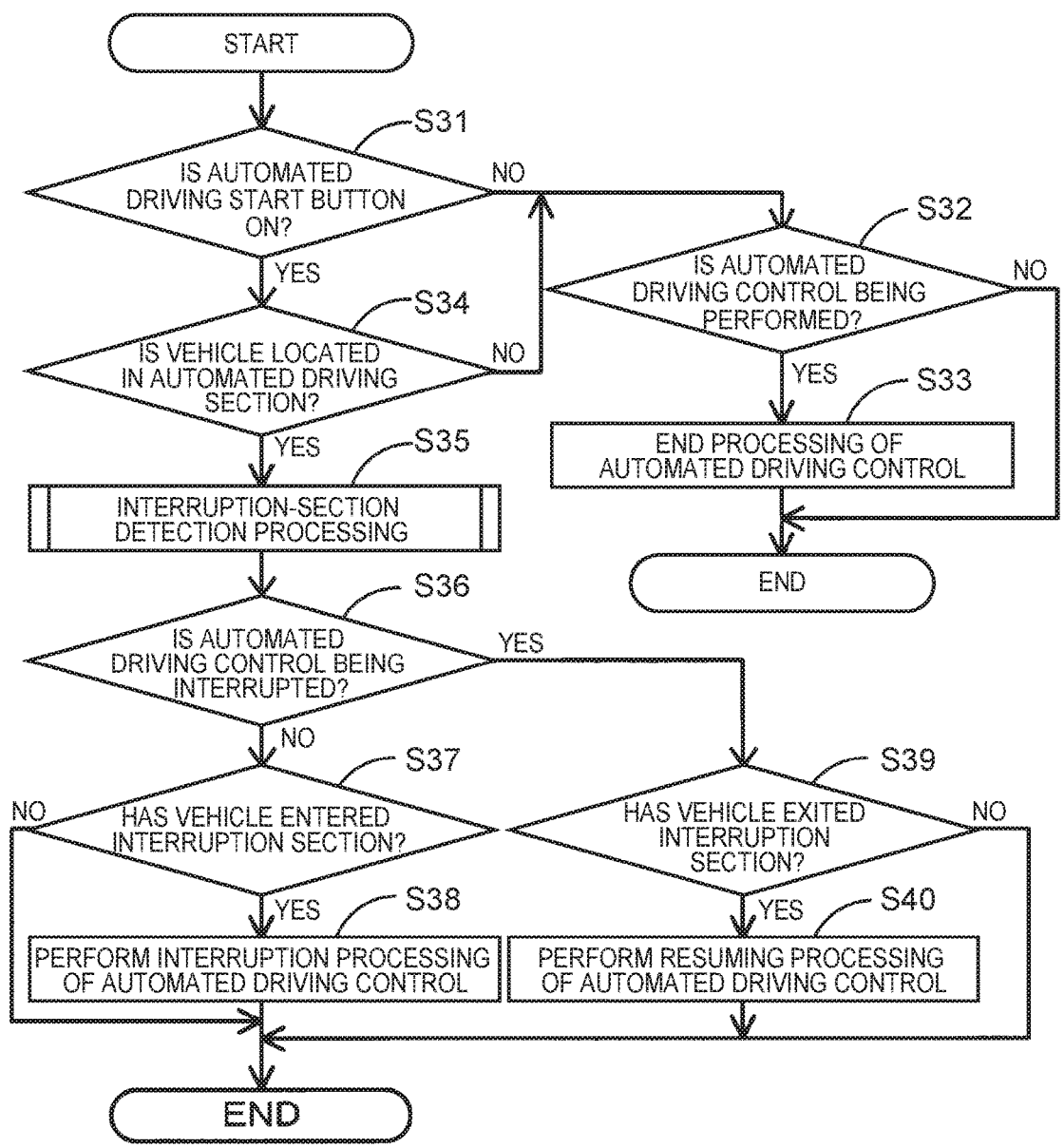
FIG. 9 is a flowchart of an automated-driving-control processing program according to the first embodiment.

The following describes the automated-driving-control processing program that the CPU 41 executes in the navigation device 1 according to the first embodiment with reference to FIG. 9. FIG. 9 is a flowchart of the automated-driving-control processing program according to the first embodiment. This automated-driving-control processing program, which is executed at predetermined intervals (e.g., intervals of 100 milliseconds) after the planned traveling route (guidance route) of the vehicle has been determined at S14 described above, is a program for determining continuation of the automated driving control and newly setting an interruption section.

To begin with, in the automated-driving-control processing program, at S31, the CPU 41 determines whether the automated driving start button is ON. This automated driving start button is disposed on the instrument panel, for example, and switches between ON and OFF every time the user depresses the button. When the automated driving start button is turned ON while the vehicle is traveling in the automated driving section (from which sections specified as interruption sections are excluded), the automated driving control is started. When the automated driving start button is turned OFF while the automated driving control is being performed, the automated driving control is ended and switched into the manual driving even if the vehicle is traveling in the automated driving section.

If it is determined that the automated driving start button is ON (YES at S31), the process proceeds to S34. If it is determined that the automated driving start button is not ON (NO at S31), the process proceeds to S32.

At S32, the CPU 41 determines whether the automated driving control of the vehicle is being performed.

If it is determined that the automated driving control of the vehicle is being performed (YES at S32), the process proceeds to S33. If it is determined that the automated driving control of the vehicle is not being performed (NO at S32), the automated-driving-control processing program is ended.

At S33, the CPU 41 performs end processing of the automated driving control. Specifically, the CPU 41 transmits an instruction signal for instructing the vehicle control ECU 20 to end the automated driving control through the CAN. Consequently, the vehicle ends the automated driving control and shifts to the manual driving.

At S34, the CPU 41 determines whether the vehicle is located in the automated driving section on the basis of the current position of the vehicle detected by the current-position detecting unit 11 and map information. The current position of the vehicle is preferred to be precisely identified by using a high-accuracy location technology. Such a high-accuracy location technology makes it possible to detect traveling lanes and the accurate position of the vehicle by detecting, through image recognition, white lines and road marking information captured by a camera mounted on the rear of the vehicle, and further by comparing the white lines and the road marking information with the map information DB stored in advance. Details of the high-accuracy location technology are already publicly known, and thus description thereof is omitted.

If it is determined that the vehicle is located in the automated driving section (YES at S34), the process proceeds to S35. If it is determined that the vehicle is not located in the automated driving section (NO at S34), the process proceeds to S32.

At S35, the CPU 41 performs interruption-section detection processing (FIG. 10) described later. This interruption-section detection processing is processing for detecting, other than a section already set as an interruption section, a section where a situation occurs in which it is difficult for the vehicle to travel by the automated driving control to newly set this section as an interruption section, as described later using the vehicle exterior camera 19 and sensors, for example, while the vehicle is traveling.

Next, at S36, the CPU 41 determines whether the automated driving control is being interrupted. As described above, even while the vehicle is traveling in an automated driving section, when the vehicle is located in a set interruption section, the automated driving control of the vehicle is interrupted and the vehicle travels by the manual driving.

If it is determined that the automated driving control is being interrupted (YES at S36), the process proceeds to S39. If it is determined that the automated driving control is not being interrupted (NO at S36), the process proceeds to S37.

At S37, the CPU 41 determines whether the vehicle has entered an interruption section. Such interruption sections are preset for a planned traveling route on which the vehicle travels in the route-search processing program (FIG. 2, FIG. 7) described above. The interruption sections are set also in the interruption-section detection processing (FIG. 10) described later.

If it is determined that the vehicle has entered an interruption section (YES at S37), the process proceeds to S38. At S38, the CPU 41 performs interruption processing of the automated driving control. Specifically, the CPU 41 transmits an instruction signal for instructing the vehicle control ECU 20 to temporarily interrupt the automated driving control through the CAN. Consequently, the vehicle temporarily interrupts the automated driving control and shifts to the manual driving. If it is determined that the vehicle has not entered an interruption section (NO at S37), the automated driving control is continuously performed.

At S39, the CPU 41 determines whether the vehicle has exited an interruption section.

If it is determined that the vehicle has exited an interruption section (YES at S39), the process proceeds to S40. At S40, the CPU 41 performs resuming processing of the automated driving control. Specifically, the CPU 41 transmits through the CAN an instruction signal for instructing the vehicle control ECU 20 to resume the automated driving control that has been interrupted. Consequently, the vehicle resumes the automated driving control that has been interrupted and shifts to the automated driving control from the manual driving. If it is determined that the vehicle has not exited an interruption section (NO at S39), the interruption of the automated driving control is continued.

Figure 10:
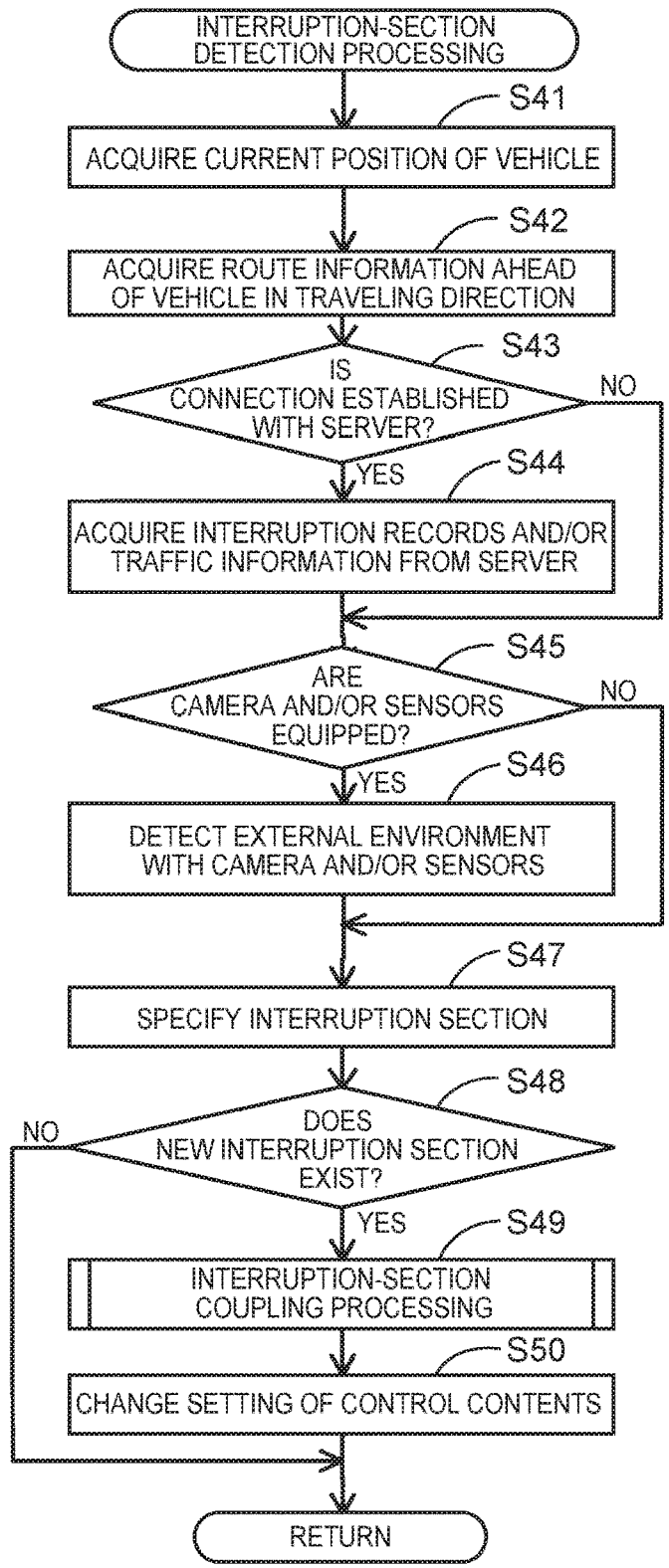
FIG. 10 is a flowchart of a sub-processing program of interruption-section detection processing.

The following describes sub-processing of the interruption-section detection processing performed at S35 described above with reference to FIG. 10. FIG. 10 is a flowchart of a sub-processing program of the interruption-section detection processing.

To begin with, at S41, the CPU 41 acquires the current position of the vehicle on the basis of the detection result of the current-position detecting unit 11. The current position of the vehicle is preferably identified by using the high-accuracy location technology.

Next, at S42, the CPU 41 acquires route information ahead of the vehicle in the traveling direction. For example, the CPU 41 acquires route information within one kilometer from the current position of the vehicle along the planned traveling route.

Subsequently, at S43, the CPU 41 determines whether connection is established with an external server storing interruption records of the automated driving control of other vehicles and/or a traffic information server such as a VICS center.

If it is determined that connection is established with an external server storing interruption records of the automated driving control of other vehicles and/or a traffic information server such as a VICS center (YES at S43), the CPU 41 acquires (at S44) the latest interruption records of the automated driving control and/or the latest traffic information for sections (hereinafter, called "detection target sections") ahead of the vehicle in the traveling direction for which the route information is acquired from the server at S42 described above. If it is determined that connection is not established with an external server storing interruption records of the automated driving control of other vehicles or a traffic information server such as a VICS center (NO at S43), the process proceeds to S45.

At S45, the CPU 41 determines whether connection is established with a camera and/or sensors, for example, for detecting external environment of the vehicle. Examples of the sensors include a millimeter wave radar for detecting an obstacle, a rain sensor for detecting rainfall and snow cover, and an illuminance sensor.

If it is determined that connection is established with a camera and/or sensors for detecting external environment of the vehicle (YES at S45), external environment around the vehicle is detected by the camera and/or the sensors connected (S46). If it is determined that connection is not established with a camera or sensors for detecting external environment of the vehicle (NO at S45), the process proceeds to S47.

Subsequently, at S47, based on the interruption records and/or the traffic information acquired at S44 described above and the external environment detected at S46 described above, the CPU 41 determines whether a section where a situation in which it is difficult for the vehicle to travel by the automated driving control occurs exists among the sections, except a section already set as an interruption section, ahead of the vehicle in the traveling direction for which the route information is acquired at S42 described above. If it is determined that a section where a situation in which it is difficult for the vehicle to travel by the automated driving control occurs exists, this section is newly specified as an interruption section. The interruption section specified at S47 described above is an interruption section that could not specified during route search but can be specified first when the vehicle reaches an actual place. For example, a section that falls under any of the conditions (6) to (9) below is specified as an interruption section.

(6) a section for which an interruption record did not exist during the route search but, during a period until the vehicle reaches the actual place, an interruption record is newly generated when another vehicle interrupts the automated driving control.

(7) a section where lanes are newly restricted due to an accident, construction, or a fallen object, for example, after the route search, and which lane is restricted cannot be identified.

(8) a section where the fact that lane markings (e.g., a roadway centerline, a lane boundary, a roadway outside line) disappear or fade to the extent that the lane markings cannot be recognized with a camera is newly detected by capturing images of the road surface with the camera.

(9) a section for which the weather becomes so bad (e.g., heavy rain, dense fog, snow cover, icy road) that it is difficult to perform detection with a camera and sensors or it is difficult to perform vehicle control, which could not be predicted during the route search.

Next, at S48, the CPU 41 determines whether an interruption section has been newly specified at S47 described above.

If it is determined that an interruption section has been newly specified (YES at S48), the process proceeds to S49. If it is determined that no interruption section has been newly specified (NO at S48), the process proceeds to S36 without newly setting an interruption section in particular.

At S49, the CPU 41 performs the interruption-section coupling processing (FIG. 7) described above. The interruption-section coupling processing is processing for connecting interruption sections that satisfy a certain condition and are adjacently arranged along a candidate route as described above to set one continuous interruption section. Thus, because an interruption section is newly specified at S47 described above, decision about coupling of interruption sections is made for this new interruption section, and if necessary, the coupling of interruption sections is performed. Note that when the vehicle speed V of the vehicle traveling between the first interruption section and the second interruption section is predicted at S25, the current vehicle speed of the vehicle (at the time when the new interruption section is specified) is preferably acquired with the vehicle speed sensor 23, and the vehicle speed V of the vehicle traveling between the first interruption section and the second interruption section is preferably predicted to be this acquired vehicle speed.

Next, at S50, the CPU 41 changes the control contents of the automated driving control set at S14 described above on the basis of the newly specified and coupled interruption section. Specifically, for a section that is newly set as an interruption section, the CPU 41 changes the control contents such that the automated driving control is not performed. Accordingly, the control contents of the automated driving control for other sections are changed if necessary. The control contents thus changed are transmitted to the vehicle control ECU 20 through the CAN. Consequently, it is possible to perform the automated driving control into which the newly specified and coupled interruption section is reflected.

As described above in detail, with the navigation device 1, the route guidance method with the navigation device 1, and the computer program executed in the navigation device 1 according to the first embodiment, when a recommended route from a departure point to a destination including an automated driving section where automated driving control of the vehicle is performed is searched for, a plurality of candidate routes that are candidates for the recommended route are acquired (S4); for each of the candidate routes acquired, an interruption section where the automated driving control is interrupted in the automated driving section included in the candidate route is specified (S8, S9); and, for each of the candidate routes, guidance is provided in a manner distinguishing a section that corresponds to the interruption section from a section that does not correspond thereto in the automated driving section included in the candidate route (S13). Thus, when a planned traveling route of a vehicle includes a section where automated driving control is interrupted, by providing guidance in a manner distinguishing this section from the other sections, it is possible to let the user understand the section where the automated driving control is interrupted. Consequently, the user can understand, in advance, in which section the automated driving control is interrupted in the planned traveling route, which makes it possible to prevent unexpected disadvantages for the user in that, for example, the automated driving control is interrupted at a location where the user does not expect the interruption to occur.

Second Embodiment

The following describes a navigation device according to a second embodiment with reference to FIG. 11. In the following description, reference numerals that are the same as those in the structure of the navigation device 1 according to the first embodiment depicted in FIG. 1 to FIG. 10 described above indicate components that are the same or equivalent as those in the navigation device 1 according to the first embodiment, for example.

The schematic structure of the navigation device according to the second embodiment is substantially the same as the structure of the navigation device 1 according to the first embodiment. The various types of control processing thereof are substantially the same as the control processing of the navigation device 1 according to the first embodiment. However, these are different in the following point. In the navigation device 1 according to the first embodiment, the navigation device 1 determines, during route search, an interruption section where the automated driving control is interrupted, and the vehicle control ECU 20 controls the vehicle in accordance with the interruption section determined by the navigation device 1 during the route search. By contrast, in the navigation device according to the second embodiment, the navigation device 1 only specifies, during route search, a section (hereinafter, called "interruption-predicted section") where there is a possibility that the automated driving control will be interrupted, and the interruption-predicted section thus specified does not affect whether the automated driving is actually interrupted (i.e., determination of whether the automated driving control is interrupted is determined by the navigation device and the vehicle control ECU 20 while the vehicle is traveling in the automated driving section).

The route-search processing program executed by the CPU 41 in the navigation device according to the second embodiment is basically the same in processing as the route-search processing program (FIG. 2) according to the first embodiment except that interruption sections are replaced with interruption-predicted sections. The automated-driving-control processing program is also basically the same in processing as the automated-driving-control processing program (FIG. 9) according to the first embodiment. However, in the route-search processing program according to the second embodiment, a section where there is a possibility that the automated driving control will be interrupted is only predicted, so that interruption-predicted sections specified at S8 and S9 described above may be different from sections where the automated driving control is actually interrupted. Thus, the control contents (see FIG. 6) of the automated driving control determined at S14 are changed as needed while the vehicle is traveling.

The interruption-section coupling processing at S9 is also performed on the interruption-predicted sections. Consequently, when interruption-predicted sections where there is a possibility that the automated driving control will be interrupted are included in a recommended route or other candidate routes, interruption-predicted sections that are adjacently arranged can be connected to set one continuous interruption-predicted section. Thus, it is possible to accurately match the interruption-predicted sections to the sections where the automated driving control is actually interrupted. It is also possible to modify the shapes of the interruption-predicted sections into shapes that the user can easily understand, without making the shapes complicated.

In the navigation device according to the second embodiment, at S10 described above, based on interruption-predicted sections set at S8 and S9 described above, the CPU 41 acquires interruption predicting information indicating that the automated driving control is predicted to be interrupted for each candidate route to be processed. The interruption predicting information contains probabilities that the automated driving control will be actually interrupted in the interruption-predicted sections, in addition to the number of times, durations, distances, and locations of the predicted interruption of the automated driving control in the candidate route to be processed and the reasons for the interruption.

At S11, when calculating the decision value D for the candidate route, the CPU 41 may use the probabilities that the automated driving control will be interrupted to calculate the additional value α, in addition to the number of times, the durations, the distances, the locations of the predicted interruption of the automated driving control and the reasons for the interruption.

For example, when the probabilities that the automated driving control will be interrupted are used to calculate the additional value α, this calculation is performed such that a higher probability of interruption produces a larger additional value α. FIG. 11 is a figure illustrating an example of correspondence between additional values α and probabilities that automated driving control will be interrupted. For example, in the case where the candidate route includes a section that is set as an interruption-predicted section because merging or lane change is performed in a short section (e.g., 500 meters or shorter), particularly when the candidate route includes an interruption-predicted section where merging or lane change is performed in a distance longer than 100 meters and equal to or shorter than 500 meters, because merging or lane change can be performed in a relatively easy manner even by the automated driving control, the probability that the automated driving control will be interrupted is low, and the additional value α is calculated to be "1". When the candidate route includes an interruption-predicted section where merging or lane change is performed in a distance equal to or shorter than 100 meters, because it is difficult to perform merging or lane change by the automated driving control, the probability that the automated driving control will be interrupted is high, and the additional value α is calculated to be "2". When the road shape of the interruption-predicted section where merging or lane change is performed cannot be identified from map information, because the automated driving control cannot be basically performed, the additional value α is calculated to be "3". In the case where the candidate route includes a section that is set as an interruption-predicted section because of snow cover or an icy road when the vehicle travels, particularly when the candidate route includes an interruption-predicted section for which icy road information exists in VICS information, the probability that the weather will become so bad that it is difficult to perform detection with a camera and sensors or it is difficult to perform vehicle control and accordingly the automated driving control will be interrupted when the vehicle travels in this section is determined to be remarkably high, and the additional value α is calculated to be "3". In the case where the candidate route includes an interruption-predicted section for which VICS information does not exist but the snowfall probability is high according to the weather forecast (e.g., 80% or higher), the probability that the weather will become so bad that it is difficult to perform detection with a camera and sensors or it is difficult to perform vehicle control and accordingly the automated driving control will be interrupted when the vehicle travels in this section is determined to be high, and the additional value α is calculated to be "2". In the case where the candidate route includes an interruption-predicted section for which VICS information does not exist and the snowfall probability is low (e.g., lower than 80%) according to the weather forecast, the probability that the weather will become so bad that it is difficult to perform detection with a camera and sensors or it is difficult to perform vehicle control and accordingly the automated driving control will be interrupted when the vehicle travels in this section is determined to be low, and the additional value α is calculated to be "1". In the same manner, for other reasons, the additional values are calculated based on the probabilities that the automated driving control will be interrupted as depicted in FIG. 11. Herein, when there are a plurality of interruption-predicted sections, the additional value α may be calculated for each of the interruption-predicted sections, and the decision value D may be calculated by using only the largest additional value α, or the decision value D may be calculated by adding all the additional values α calculated to the required time T. Consequently, the decision value D of a candidate route including an interruption-predicted section where the automated driving control is interrupted with a higher probability can be calculated to be larger (which makes it difficult for this route to be selected as a recommended route), and thus a more appropriate recommended route can be selected.

Herein, the structure for calculating the decision values D of the candidate routes on the basis of the numbers of times, durations, distances, and locations of the predicted interruption of the automated driving control and the reasons for the interruption is the same as that in the first embodiment, and thus description thereof is omitted.

In the navigation device according to the second embodiment, when guidance about information on a recommended route and other candidate routes other than the recommended route is provided at S13, the guidance may be provided in a manner depending on the probabilities that the automated driving control will be interrupted. Specifically, display colors or display patterns of interruption-predicted sections included in a recommended route, for example, are changed in accordance with the interruption probabilities. For example, in the route guidance screen 51 depicted in FIG. 5, an interruption-predicted section where the interruption probability is predicted to be high (80% or higher) can be displayed in red, an interruption-predicted section where the interruption probability is predicted to be medium (lower than 80% and equal to or higher than 50%) can be displayed in green, and an interruption-predicted section where the interruption probability is predicted to be low (lower than 50%) can be displayed in blue. Consequently, by watching the route guidance screen 51, the user can easily understand in which section and at what probability the automated driving control will be interrupted.

As described above in detail, with the navigation device, the route guidance method with the navigation device, and the computer program executed in the navigation device according to the second embodiment, when a recommended route from a departure point to a destination including an automated driving section where automated driving control of the vehicle is performed is searched for, a plurality of candidate routes that are candidates for the recommended route are acquired; for each of the candidate routes acquired, an interruption-predicted section where there is a possibility that the automated driving control will be interrupted in the automated driving section included in the candidate route is specified; and, for each of the candidate routes, guidance is provided in a manner distinguishing a section that corresponds to the interruption-predicted section from a section that does not correspond thereto in the automated driving section included in the candidate route. Thus, when a planned traveling route of a vehicle includes a section where there is a possibility that automated driving control will be interrupted, by providing guidance in a manner distinguishing this section from the other sections, it is possible to let the user understand the section where there is a possibility that the automated driving control will be interrupted. Consequently, the user can understand, in advance, in which section there is a possibility that the automated driving control will be interrupted in the planned traveling route, which makes it possible to prevent unexpected disadvantages for the user in that, for example, the automated driving control is interrupted at a location where the user does not expect the interruption to occur.

It should be noted that the present disclosure is not limited to the embodiments described above, and as a matter of course, various improvements and modifications can be made within a scope not departing from the gist of the present disclosure.

For example, in the first embodiment and the second embodiment, sections where the automated driving control is interrupted or may be interrupted in an automated driving section are specified (S8, S47). However, sections where the manual driving is interrupted to perform the automated driving control or sections where there is a possibility that the manual driving will be interrupted to perform the automated driving control may be specified. In this case, sections that do not fall under any of the conditions (1) to (5) above are sections where the manual driving is interrupted to perform the automated driving control or sections where there is a possibility that the manual driving will be interrupted to perform the automated driving control. For the sections thus specified, the interruption-section coupling processing depicted in FIG. 7 can be performed in the same manner. Furthermore, each decision values D is calculated based on information indicating that the manual driving is interrupted or is predicted to be interrupted, whereby a recommended route is selected. In the calculation of the decision value D at S11, in contrast to the first embodiment and the second embodiment, the additional value α is set to be a smaller value as the number of times, durations, or distances of the interruption of the manual driving or predicted to be interrupted increase. The additional value α is set to be a smaller value when the location where the manual driving is interrupted or is predicted to be interrupted is located closer to the destination on the candidate route.

In the first embodiment and the second embodiment, the navigation device 1 is configured to set control contents (e.g., going straight, changing lanes to the right, merging) of the automated driving control that is performed on the vehicle. Alternatively, the vehicle control ECU 20 may be configured to set the control contents of automated driving. The control contents of the automated driving control do not necessarily have to be set during route search, and may be set by the time the vehicle reaches the automated driving section.

In the first embodiment and the second embodiment, the interruption-section detection processing (FIG. 10) described above is performed when the vehicle is traveling in an automated driving section, but may be performed only when the vehicle is traveling in an interruption section in particular. In this case, when an interruption section is newly specified at S47, an interruption section where the vehicle is currently located and the interruption section newly specified are coupled together at S49. Furthermore, when the interruption-section detection processing (FIG. 10) is performed only when the vehicle is traveling in the interruption section, a detection range (i.e., a range within which route information is acquired at S42, a range within which interruption information and traffic information are acquired at S44, and a detection range of a camera and sensors at S46) within which a section where the automated driving control needs to be interrupted is newly detected may be set ahead of the vehicle in the traveling direction in accordance with the vehicle speed of the vehicle. For example, as the vehicle speed of the vehicle increases, the detection range is set wider. Consequently, the required time Z from the end point of the interruption section where the vehicle is currently located to the start point of the interruption section newly specified is inevitably equal to or shorter than the threshold, which enables the processing at S22 to S27 to be omitted.

In the first embodiment and the second embodiment, description has been made assuming that the automated driving control for traveling in an automated way without driving operation of the user means that, out of operations of the vehicle, all of accelerator operation, brake operation, and steering operation that are operations related to vehicle behavior are controlled by the vehicle control ECU 20. However, as the automated driving control, the vehicle control ECU 20 may be configured to control, out of operations of the vehicle, at least one of accelerator operation, brake operation, and steering operation that are operations related to vehicle behavior. By contrast, description is made assuming that the manual driving by driving operation of the user means that, out of operations of the vehicle, all of accelerator operation, brake operation, and steering operation that are operations related to vehicle behavior are performed by the user.

In the first embodiment and the second embodiment, the navigation device 1 is configured to perform the route change processing program (FIG. 2) and the automated driving control program (FIG. 9). Alternatively, the vehicle control ECU 20 may be configured to perform these programs. In this case, the vehicle control ECU 20 is configured to acquire the current position of the vehicle, map information, and traffic information, for example, from the navigation device 1.

The present disclosure can be also applied to devices having a route search function in addition to navigation devices. For example, the present disclosure can be applied to mobile phones, smart phones, tablet terminals, personal computers, for example (hereinafter, called "mobile terminals, etc."). The present disclosure can be also applied to a system including a server and mobile terminals, etc. In this case, any of the server and the mobile terminals, etc. may be configured to perform the respective steps of the route change processing program (FIG. 2) and the automated driving control program (FIG. 9) described above. Note that when the present disclosure is applied to the mobile terminals, etc., connection needs to be established such that the mobile terminals, etc. can communicate with vehicles that can perform automated driving control (regardless of whether the connection is wired or wireless).

Examples in which the route searching system according to the present disclosure is embodied have been described in the foregoing, but the route searching system may have structures described below. In this case, effects described below are obtained.

For example, the first structure is as follows.

The route guidance system is further includes interruption information acquisition code for, based on the interruption section specified by the interruption section specifying code, acquiring interruption information indicating that the automated driving control is interrupted in the automated driving section included in the planned traveling route, and t the route guidance code provides guidance about the planned traveling route and also about the interruption information acquired by the interruption information acquisition code.

With the route guidance system having this structure, it is possible to understand, in addition to a location where the automated driving control is interrupted in the planned traveling route, more detailed information on the interruption. Thus, an unexpected disadvantage for the user due to the interruption of the automated driving control can be more reliably prevented from arising.

The second structure is as follows.

In the route guidance system, t the interruption information contains any of the number of times, a duration, and a distance of the interruption of the automated driving control and the reason for the interruption.

With the route guidance system having this structure, it is possible to understand, in addition to a location where the automated driving control is interrupted in the planned traveling route, specifically how the automated driving control is interrupted.

The third structure is as follows.

The route guidance system further includes interruption-predicting information acquisition code for, based on the interruption-predicted section specified by the interruption-predicted section specifying codes, acquiring interruption predicting information indicating that the automated driving control is predicted to be interrupted in the automated driving section included in the planned traveling route, and t the route guidance code provides guidance about the planned traveling route and also about the interruption predicting information acquired by the interruption-predicting information acquisition code.

With the route guidance system having this structure, it is possible to understand, in addition to a location where there is a possibility that the automated driving control will be interrupted in the planned traveling route, more detailed information on the interruption. Thus, an unexpected disadvantage for the user due to the interruption of the automated driving control can be more reliably prevented from arising.

The fourth structure is as follows.

In the route guidance system, the interruption predicting information contains any of the number of times, a duration, and a distance of the predicted interruption of the automated driving control and the reason for the interruption.

With the route guidance system having this structure, it is possible to understand, in addition to a location where there is a possibility that the automated driving control will be interrupted in the planned traveling route, specifically how the automated driving is interrupted.

The fifth structure is as follows.

In the route guidance system the planned traveling route includes a plurality of routes as candidates for a recommended route from a departure point to a destination, and the route guidance code provides guidance for, out of a plurality of the planned traveling routes, a planned traveling route with a higher priority in a prioritized manner based on the interruption information or the interruption predicting information.

With the route guidance system having this structure, when providing guidance about candidates for a recommended route to a destination, considering interruption of the automated driving control, it is possible to provide guidance about a candidate that is more important for a user in a prioritized manner.

The sixth structure is as follows.

In the route guidance system the planned traveling route includes a plurality of routes as candidates for a recommended route from a departure point to a destination, and the route guidance code displays the interruption information or the interruption predicting information on a display device in a manner sorted in a table for each planned traveling route.

With the route guidance system having this structure, when guidance about candidates for a recommended route to a destination is provided, it is possible to compare information on interruption of the automated driving control between the candidates to provide guidance. Thus, the user can visually recognize information on interruption of the automated driving control for each candidate for a recommended route for which guidance is provided, thereby being able to select a route that is more appropriate for the user as the recommended route.

The seventh structure is as follows.

The route guidance system further includes interruption-probability acquisition code for acquiring an interruption probability that is a probability that the automated driving control will be interrupted in the interruption-predicted section, and t the route guidance code provides guidance about the section that corresponds to the interruption-predicted section in the automated driving section included in the planned traveling route in a manner depending on the interruption probability of the interruption-predicted section.

With the route guidance system having this structure, the user can easily understand in which section and at what probability the automated driving control will be interrupted in the planned traveling route.

The eighth structure is as follows.

In the route guidance system the route guidance code provides guidance about a section that corresponds to the interruption section or the interruption-predicted section and guidance about a section that does not corresponds thereto in the automated driving section included in the planned traveling route in different guidance manners.

With the route guidance system having this structure, the user can easily identify and understand a location where the automated driving control is interrupted and a location where the automated driving control is not interrupted in the planned traveling route.

The ninth structure is as follows.

The route guidance system further includes control content setting code for, for a section in the automated driving section included in the planned traveling route from which the interruption section or the interruption-predicted section is excluded, setting control contents of the automated driving control that is performed on the vehicle.

With the route guidance system having this structure, considering in advance a section where the automated driving control is interrupted, it is possible to set the control contents of the automated driving control that is performed on the vehicle traveling on the planned traveling route. This eliminates the need of setting the control contents of the automated driving control while traveling, and also eliminates the need to modify the set control contents every time the automated driving control is interrupted, thereby making it possible to reduce the processing load related to the automated driving control.

The tenth structure is as follows.

A route guidance system includes: route acquisition code for acquiring a planned traveling route of a vehicle including an automated driving section where the vehicle is allowed to perform automated driving control in addition to manual driving; manual-interruption section specifying code for specifying a manual-driving interruption section where the manual driving is interrupted and the automated driving control is performed in the automated driving section included in the planned traveling route; and route guidance code for providing guidance for the planned traveling route in a manner distinguishing a section that corresponds to the manual-driving interruption section from a section that does not correspond thereto in the automated driving section included in the planned traveling route.

With the route guidance system having this structure, when a planned traveling route of a vehicle includes an interruption section where manual driving is interrupted (i.e., a section where automated driving control is performed), by providing guidance in a manner distinguishing this section from the other sections, it is possible to let the user understand the section where the manual driving is interrupted. Thus, the user can understand, in advance, in which section the manual driving is interrupted in the planned traveling route, which makes it possible to prevent unexpected disadvantages for the user in that, for example, the manual driving is interrupted at a location where the user does not expect the interruption to occur.

The eleventh structure is as follows.

A route guidance system includes: route acquisition code for acquiring a planned traveling route of a vehicle including an automated driving section where the vehicle is allowed to perform automated driving control in addition to manual driving; manual-interruption-predicted section specifying code for specifying a manual-driving-interruption-predicted section where there is a possibility that the manual driving will be interrupted and the automated driving control will be performed in the automated driving section included in the planned traveling route; and route guidance code for providing guidance for the planned traveling route in a manner distinguishing a section that corresponds to the manual-driving-interruption-predicted section from a section that does not correspond thereto in the automated driving section included in the planned traveling route.

With the route guidance system having this structure, when a planned traveling route of a vehicle includes an interruption section where there is a possibility that manual driving will be interrupted (i.e., a section where automated driving control is predicted to be performed), by providing guidance in a manner distinguishing this section from the other sections, it is possible to let the user understand the section where there is a possibility that the manual driving will be interrupted. Thus, the user can understand, in advance, in which section there is a possibility that the manual driving will be interrupted in the planned traveling route, which makes it possible to prevent unexpected disadvantages for the user in that, for example, the manual driving is interrupted at a location where the user does not expect the interruption to occur.

DESCRIPTION OF THE REFERENCE NUMERALS 1 navigation device
13 navigation ECU
14. operating unit
15 liquid crystal display
41 CPU
42 RAM
43 ROM
51 route guidance screen
52 information window
54 recommended route
55 candidate route
56 section-specifying line segment
57 interruption icon

The invention claimed is:

1. A route guidance system comprising:
a central processing unit having executable program instructions stored thereon, wherein the instructions comprise:
route acquisition code for acquiring a planned traveling route of a vehicle including an automated driving section where automated driving control of the vehicle is performed;
interruption section specifying code for specifying an interruption section where the automated driving control is interrupted in the automated driving section included in the planned traveling route;
route guidance code for providing guidance for the planned traveling route in a manner distinguishing a section that corresponds to the interruption section from a section that does not correspond thereto in the automated driving section included in the planned traveling route;

route acquisition code for acquiring a planned traveling route of a vehicle including an automated driving section where automated driving control of the vehicle is performed;

interruption-predicted section specifying code for specifying an interruption-predicted section where there is a possibility that the automated driving control will be interrupted in the automated driving section included in the planned traveling route; and route guidance code for providing guidance for the planned traveling route in a manner distinguishing a section that corresponds to the interruption-predicted section from a section that does not correspond thereto in the automated driving section included in the planned traveling route, wherein the planned traveling route includes a plurality of routes as candidates for a recommended route from a departure point to a destination and the route guidance code calculates a decision value for each of the plurality of routes, wherein the decision value is a sum of a time to travel a corresponding one of the plurality of routes and an additional value corresponding to at least one or more of a number of times, a duration, a distance, a location and a reason of the interruption-predicted section on the corresponding one of the plurality of routes, and the route guidance code provides guidance for, out of the plurality of routes, a route with a higher priority in a prioritized manner based on the decision value.

2. The route guidance system according to claim 1, further comprising interruption information acquisition code, based on the interruption section specified by the interruption section specifying code, acquiring interruption information indicating that the automated driving control is interrupted in the automated driving section included in the planned traveling route, wherein the route guidance code provides guidance about the planned traveling route and also about the interruption information acquired by the interruption information acquisition code.

3. The route guidance system according to claim 2, wherein the interruption information contains any of number of times, a duration, and a distance of the interruption of the automated driving control and a reason for the interruption.

4. The route guidance system according to claim 2, further comprising interruption-predicting information acquisition code, based on the interruption-predicted section specified by the interruption-predicted section specifying code, acquiring interruption predicting information indicating that the automated driving control is predicted to be interrupted in the automated driving section included in the planned traveling route, wherein the route guidance code provides guidance about the planned traveling route and also about the interruption predicting information acquired by the interruption-predicting information acquisition code.

5. The route guidance system according to claim 4, wherein the interruption predicting information contains any of number of times, a duration, and a distance of the predicted interruption of the automated driving control and a reason for the interruption.

6. The route guidance system according to claim 4, wherein the planned traveling route includes a plurality of routes as candidates for a recommended route from a departure point to a destination, and the route guidance code displays the interruption information or the interruption predicting information on a display device in a manner sorted in a table for each planned traveling route.

7. The route guidance system according to claim 1, further comprising interruption-probability acquisition code for acquiring an interruption probability that is a probability that the automated driving control will be interrupted in the interruption-predicted section, wherein the route guidance code provides guidance about the section that corresponds to the interruption-predicted section in the automated driving section included in the planned traveling route in a manner depending on the interruption probability of the interruption-predicted section.

8. The route guidance system according to claim 1, wherein the route guidance code provides guidance about a section that corresponds to the interruption section or the interruption-predicted section and guidance about a section that does not corresponds thereto in the automated driving section included in the planned traveling route in different guidance manners.

9. The route guidance system according to claim 1, further including control content setting code, for a section in the automated driving section included in the planned traveling route from which the interruption section or the interruption-predicted section is excluded, setting control contents of the automated driving control that is performed on the vehicle.

10. A route guidance system comprising:
a central processing unit having executable program instructions stored thereon, wherein the instructions comprise:

route acquisition code for acquiring a planned traveling route of a vehicle including an automated driving section where the vehicle is allowed to perform automated driving control in addition to manual driving;

manual-interruption section specifying code for specifying a manual-driving interruption section where the manual driving is interrupted and the automated driving control is performed in the automated driving section included in the planned traveling route;

route guidance code for providing guidance for the planned traveling route in a manner distinguishing a section that corresponds to the manual-driving interruption section from a section that does not correspond thereto in the automated driving section included in the planned traveling route;

route acquisition code for acquiring a planned traveling route of a vehicle including an automated driving section where automated driving control of the vehicle is performed;

interruption-predicted section specifying code for specifying an interruption-predicted section where there is a possibility that the automated driving control will be interrupted in the automated driving section included in the planned traveling route; and route guidance code for providing guidance for the planned traveling route in a manner distinguishing a section that corresponds to the interruption-predicted section from a section that does not correspond thereto in the automated driving section included in the planned traveling route, wherein the planned traveling route includes a plurality of routes as candidates for a recommended route from a departure point to a destination and calculates a decision value for each of the plurality of routes, wherein the decision value is a sum of a time to travel a corresponding one of the plurality of routes and an additional value corresponding to at least one or more of a number of times, a duration, a distance, a location and a reason of the interruption-predicted section on the corresponding one of the plurality of routes, and the route guidance code provides guidance for, out of the plurality of routes, a route with a higher priority in a prioritized manner based on the decision value.

11. A route guidance system comprising:
a central processing unit having executable program instructions stored thereon, wherein the instructions comprise:
route acquisition code for acquiring a planned traveling route of a vehicle including an automated driving section where the vehicle is allowed to perform automated driving control in addition to manual driving;
manual-interruption-predicted section specifying code for specifying a manual-driving-interruption-predicted section where there is a possibility that the manual driving will be interrupted and the automated driving control will be performed in the automated driving section included in the planned traveling route;
route guidance code for providing guidance for the planned traveling route in a manner distinguishing a section that corresponds to the manual-driving-interruption-predicted section from a section that does not correspond thereto in the automated driving section included in the planned traveling route,
route acquisition code for acquiring a planned traveling route of a vehicle including an automated driving section where automated driving control of the vehicle is performed;
interruption-predicted section specifying code for specifying an interruption-predicted section where there is a possibility that the automated driving control will be interrupted in the automated driving section included in the planned traveling route; and
route guidance code for providing guidance for the planned traveling route in a manner distinguishing a section that corresponds to the interruption-predicted section from a section that does not correspond thereto in the automated driving section included in the planned traveling route,
wherein the planned traveling route includes a plurality of routes as candidates for a recommended route from a departure point to a destination and the route guidance code calculates a decision value for each of the plurality of routes,
wherein the decision value is a sum of a time to travel a corresponding one of the plurality of routes and an additional value corresponding to at least one or more of a number of times, a duration, a distance, a location and a reason of the interruption-predicted section on the corresponding one of the plurality of routes, and
the route guidance code provides guidance for, out of the plurality of routes, a route with a higher priority in a prioritized manner based on the decision value.

12. A route guidance method comprising:
a step of, by route acquisition code, acquiring a planned traveling route of a vehicle including an automated driving section where automated driving control of the vehicle is performed;
a step of, by interruption section specifying code, specifying an interruption section where the automated driving control is interrupted in the automated driving section included in the planned traveling route;
a step of, by route guidance code, providing guidance for the planned traveling route in a manner distinguishing a section that corresponds to the interruption section from a section that does not correspond thereto in the automated driving section included in the planned traveling route;
a step of, by route acquisition code, acquiring a planned traveling route of a vehicle including an automated driving section where automated driving control of the vehicle is performed;
a step of, by interruption-predicted section specifying code, specifying an interruption-predicted section where there is a possibility that the automated driving control will be interrupted in the automated driving section included in the planned traveling route; and
a step of, by route guidance code, providing guidance for the planned traveling route in a manner distinguishing a section that corresponds to the interruption-predicted section from a section that does not correspond thereto in the automated driving section included in the planned traveling route,
wherein the planned traveling route includes a plurality of routes as candidates for a recommended route from a departure point to a destination and the route guidance code calculates a decision value for each of the plurality of routes,
wherein the decision value is a sum of a time to travel a corresponding one of the plurality of routes and an additional value corresponding to at least one or more of a number of times, a duration, a distance, a location and a reason of the interruption-predicted section on the corresponding one of the plurality of routes,
the route guidance code provides guidance for, out of the plurality of routes, a route with a higher priority in a prioritized manner based on the decision value.

13. A route guidance method comprising:
a step of, by route acquisition code, acquiring a planned traveling route of a vehicle including an automated driving section where automated driving control of the vehicle is performed;
a step of, by interruption-predicted section specifying code, specifying an interruption-predicted section where there is a possibility that the automated driving control will be interrupted in the automated driving section included in the planned traveling route;
a step of, by route guidance code, providing guidance for the planned traveling route in a manner distinguishing a section that corresponds to the interruption-predicted section from a section that does not correspond thereto in the automated driving section included in the planned traveling route;
a step of, by route acquisition code, acquiring a planned traveling route of a vehicle including an automated driving section where automated driving control of the vehicle is performed;
a step of, by interruption-predicted section specifying code, specifying an interruption-predicted section where there is a possibility that the automated driving control will be interrupted in the automated driving section included in the planned traveling route; and
a step of, by route guidance code, providing guidance for the planned traveling route in a manner distinguishing a section that corresponds to the interruption-predicted section from a section that does not correspond thereto in the automated driving section included in the planned traveling route, wherein the planned traveling route includes a plurality of routes as candidates for a recommended route from a departure point to a destination and the route guidance code calculates a decision value for each of the plurality of routes, wherein the decision value is a sum of a time to travel a corresponding one of the plurality of routes and an additional value corresponding to at least one or more of a number of times, a duration, a distance, a location and a reason of the interruption-predicted section on the corresponding one of the plurality of routes, the route guidance code provides guidance for, out of the plurality of routes, a route with a higher priority in a prioritized manner based on the decision value.

14. A non-transitory computer readable medium containing a computer program comprising:

route acquisition code for acquiring a planned traveling route of a vehicle including an automated driving section where automated driving control of the vehicle is performed;

interruption section specifying code for specifying an interruption section where the automated driving control is interrupted in the automated driving section included in the planned traveling route;

route guidance code for providing guidance for the planned traveling route in a manner distinguishing a section that corresponds to the interruption section from a section that does not correspond thereto in the automated driving section included in the planned traveling route;

route acquisition code for acquiring a planned traveling route of a vehicle including an automated driving section where automated driving control of the vehicle is performed;

interruption-predicted section specifying code for specifying an interruption-predicted section where there is a possibility that the automated driving control will be interrupted in the automated driving section included in the planned traveling route; and route guidance code for providing guidance for the planned traveling route in a manner distinguishing a section that corresponds to the interruption-predicted section from a section that does not correspond thereto in the automated driving section included in the planned traveling route, wherein the planned traveling route includes a plurality of routes as candidates for a recommended route from a departure point to a destination and the route guidance code calculates a decision value for each of the plurality of routes, wherein the decision value is a sum of a time to travel a corresponding one of the plurality of routes and an additional value corresponding to at least one or more of a number of times, a duration, a distance, a location and a reason of the interruption-predicted section on the corresponding one of the plurality of routes, the route guidance code provides guidance for, out of the plurality of routes, a route with a higher priority in a prioritized manner based on the decision value.

15. A non-transitory computer readable medium containing a computer program comprising:

route acquisition code for acquiring a planned traveling route of a vehicle including an automated driving section where automated driving control of the vehicle is performed;

interruption-predicted section specifying code for specifying an interruption-predicted section where there is a possibility that the automated driving control will be interrupted in the automated driving section included in the planned traveling route;

route guidance code for providing guidance for the planned traveling route in a manner distinguishing a section that corresponds to the interruption-predicted section from a section that does not correspond thereto in the automated driving section included in the planned traveling route;

route acquisition code for acquiring a planned traveling route of a vehicle including an automated driving section where automated driving control of the vehicle is performed;

interruption-predicted section specifying code for specifying an interruption-predicted section where there is a possibility that the automated driving control will be interrupted in the automated driving section included in the planned traveling route; and route guidance code for providing guidance for the planned traveling route in a manner distinguishing a section that corresponds to the interruption-predicted section from a section that does not correspond thereto in the automated driving section included in the planned traveling route, wherein the planned traveling route includes a plurality of routes as candidates for a recommended route from a departure point to a destination and the route guidance code calculates a decision value for each of the plurality of routes, wherein the decision value is a sum of a time to travel a corresponding one of the plurality of routes and an additional value corresponding to at least one or more of a number of times, a duration, a distance, a location and a reason of the interruption-predicted section on the corresponding one of the plurality of routes, the route guidance code provides guidance for, out of the plurality of routes, a route with a higher priority in a prioritized manner based on the decision value.

* * * * *